(12) United States Patent
Zhang

(10) Patent No.: US 12,471,272 B2
(45) Date of Patent: Nov. 11, 2025

(54) SEMICONDUCTOR DEVICE, MEMORY AND STORAGE SYSTEM

(71) Applicant: Yangtze Memory Technologies Co., Ltd., Hubei (CN)

(72) Inventor: Hao Zhang, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 512 days.

(21) Appl. No.: 18/090,108

(22) Filed: Dec. 28, 2022

(65) Prior Publication Data

US 2024/0164086 A1 May 16, 2024

(30) Foreign Application Priority Data

Nov. 14, 2022 (CN) .......................... 202211426515.9

(51) Int. Cl.
*H10B 12/00* (2023.01)
(52) U.S. Cl.
CPC ........... *H10B 12/482* (2023.02); *H10B 12/03* (2023.02); *H10B 12/488* (2023.02)
(58) Field of Classification Search
CPC ...... H10B 12/00; H10B 12/03; H10B 12/315; H10B 12/482; H10B 12/488
USPC .................................................. 257/906, 908
See application file for complete search history.

(56) References Cited

U.S. PATENT DOCUMENTS

2020/0273865 A1* 8/2020 Manipatruni ....... G11C 11/2257

\* cited by examiner

*Primary Examiner* — Hoai V Pham
(74) *Attorney, Agent, or Firm* — Oblon, McClelland, Maier & Neustadt, L.L.P.

(57) ABSTRACT

A semiconductor device includes an active layer having a first side and a second side, a bit line layer having a first bit line sub-layer disposed on the first side and a second bit line sub-layer disposed on the second side, and capacitor structures. The active layer includes active units arranged in an array and disposed at intervals. The first and second bit line sub-layers are connected with the active units. The capacitor structures are disposed on the first side and the second side of the active layer and connected with the active units. By disposing the bit lines and the capacitor structures on two opposite sides of two ends of the active units, the semiconductor device can have larger spaces on the two sides of the ends of the active units to accommodate the capacitor structures, as compared with a semiconductor device with the same number of capacitor structures.

20 Claims, 14 Drawing Sheets

SEMICONDUCTOR DEVICE, MEMORY AND STORAGE SYSTEM

CROSS-REFERENCE TO RELATED APPLICATIONS

This present disclosure claims the benefit of Chinese Patent Application No. 202211426515.9 filed on Nov. 14, 2022, which is incorporated herein by reference in its entirety.

TECHNICAL FIELD

The present disclosure relates to the field of semiconductors, in particular to a semiconductor device, a memory and a storage system.

BACKGROUND

In recent years, in dynamic random memories, sizes of capacitor structures have a great influence on the overall capacitance value, and how to increase the overall capacitance value is a research topic of technicians.

Accordingly, a semiconductor device, a memory and a storage system are in urgent need to address the above technical problem.

SUMMARY

The present disclosure provides a semiconductor device, a memory and a storage system, which can increase the overall capacitance value of the current semiconductor device.

The present disclosure provides a semiconductor device. For example, the semiconductor can include: an active layer including a plurality of active units arranged in an array and disposed at intervals, the active layer having a first side and a second side at two ends of the active units; a bit line layer including a first bit line sub-layer disposed on the first side of the active layer and a second bit line sub-layer disposed on the second side of the active layer, the first bit line sub-layer and the second bit line sub-layer being connected with the active units respectively; and a plurality of capacitor structures disposed on the first side and the second side of the active layer and connected with the active units respectively.

In some implementations, the first bit line sub-layer can include first bit lines, the second bit line sub-layer can include second bit lines, an extending direction of the first bit lines is parallel to an extending direction of the second bit lines, and orthographic projections of the first bit lines on the active layer can be disposed not to overlap with orthographic projections of the second bit lines on the active layer.

In some implementations, the orthographic projections of the first bit lines on the active layer and the orthographic projections of the second bit lines on the active layer can be disposed alternately.

In some implementations, the active units can include first active pillars connected with the first bit lines and second active pillars connected with the second bit lines, the capacitor structures can include first capacitor units and second capacitor units, the first capacitor units can be disposed on the second side of the active layer, the second capacitor units can be disposed on the first side of the active layer, the first capacitor units can be connected with the first active pillars, and the second capacitor units can be connected with the second active pillars. In some implementations, the first capacitor units can include first subunits and second subunits, the first subunits can include first contact plugs, first lead portions and first capacitor portions, the first contact plugs can be in contact connection with the first active pillars, the first capacitor portions can be connected with the first contact plugs through the first lead portions, the second subunits can include second contact plugs and second capacitor portions, the second contact plugs can be in contact connection with the first active pillars, and the second capacitor portions can be connected with the first active pillars through the second contact plugs.

In some implementations, the second capacitor units can include third subunits and fourth subunits, the third subunits can include third contact plugs, second lead portions and third capacitor portions, the third contact plugs can be in contact connection with the second active pillars, the third capacitor portions can be connected with the third contact plugs through the second lead portions, the fourth subunits can include fourth contact plugs and fourth capacitor portions, the fourth contact plugs can be in contact connection with the second active pillars, and the fourth capacitor portions can be connected with the second active pillars through the fourth contact plugs.

In some implementations, in orthographic projections of the first bit line sub-layer and the second bit line sub-layer on the active layer, leading-out directions of the respective first lead portions corresponding to the respective first bit lines can be the same, leading-out directions of the respective second lead portions corresponding to the respective second bit lines can be the same, and the leading-out directions of the first lead portions corresponding to the first bit lines can be opposite to the leading-out directions of the second lead portions corresponding to the adjacent second bit lines.

In some implementations, orthographic projections of the first capacitor units on the active layer can overlap with the orthographic projections of both the first bit lines and the second bit lines on the active layer, and orthographic projections of the second capacitor units on the active layer can overlap with the orthographic projections of both the first bit lines and the second bit lines on the active layer.

In some implementations, the first capacitor units can include fifth capacitor portions and fifth contact plugs, the fifth contact plugs can be in contact connection with the first active pillars, the fifth capacitor portions can expand in a direction toward the adjacent first bit lines, an expanding direction of the fifth capacitor portions can be perpendicular to an extending direction of the first bit lines, the second capacitor units can include sixth capacitor portions and sixth contact plugs, the sixth contact plugs can be in contact connection with the second active pillars, the sixth capacitor portions can expand in a direction toward the adjacent second bit lines, and an expanding direction of the sixth capacitor portions can be perpendicular to an extending direction of the second bit lines.

In some implementations, the fifth capacitor portions can include first ends connected with the fifth contact plugs and second ends far away from the fifth contact plugs, and the sixth capacitor portions can include third ends connected with the sixth contact plugs and fourth ends far away from the sixth contact plugs. In an implementation, in orthographic projections of the capacitor structures on the active layer, a direction from the first ends to the second ends can be a first expanding direction, a direction from the third ends to the fourth ends can be a second expanding direction, the first expanding directions of two adjacent ones of the first capacitor units corresponding to the same first bit line can be the same, and the second expanding directions of two adjacent ones of the second capacitor units corresponding to the same second bit line can be the same. In another implementation, the first expanding directions of two adjacent ones of the first capacitor units corresponding to the same first bit line can be opposite, and the second expanding directions of two adjacent ones of the second capacitor units corresponding to the same second bit line can be opposite.

In some implementations, in orthographic projections of the capacitor structures and the bit line layer on the active layer, sizes of the first capacitor units in a direction perpendicular to the first bit lines can be larger than those of the first capacitor units in a direction parallel to the first bit lines, and sizes of the second capacitor units in a direction perpendicular to the second bit lines can be larger than sizes of the second capacitor units in a direction parallel to the second bit lines.

In some implementations, the first bit line sub-layer can include first bit line groups of which an extending direction is a first direction, two columns of the active units arranged alternately along the first direction can correspond to one of the first bit line groups, the second bit line sub-layer can include second bit line groups of which an extending direction is the first direction, and two columns of the active units arranged alternately along the first direction can correspond to one of the second bit line groups.

In some implementations, orthographic projections of the first bit line groups on the active layer can be disposed to overlap with orthographic projections of the second bit line groups on the active layer.

In some implementations, the first bit line groups can include first insulating portions and first conductor portions disposed between the first insulating portions and the active layer, the second bit line groups can include second insulating portions and second conductor portions disposed between the second insulating portions and the active layer, and the active units connected to the first conductor portions can be different from the active units connected to the second conductor portions.

In some implementations, the capacitor structures can include capacitor components and contact plug portions, the contact plug portions can be disposed within the bit line layer and include contact conductive sub-portions and contact insulating sub-portions between the contact conductive sub-portions and the bit line layer, and the capacitor components can be in contact connection with the active units through the contact conductive sub-portions.

In some implementations, the active units can include first active pillars connected with the first bit line groups and second active pillars connected with the second bit line groups, the capacitor components can include seventh capacitor portions and eighth capacitor portions, the seventh capacitor portions are disposed on the second side of the active layer, the eighth capacitor portions can be disposed on the first side of the active layer, the seventh capacitor portions can be connected with the first active pillars, and the eighth capacitor portions can be connected with the second active pillars.

In some implementations, a direction perpendicular to an extending direction of the first bit line groups can be a second direction, and the first active pillars and the second active pillars can be disposed alternately along the first direction and the second direction.

In some implementations, the semiconductor device can further include word lines disposed on sidewalls of the active units.

Implementations of the present disclosure further provide a memory including any one of the above semiconductor devices.

Implementations of the present disclosure further provide a storage system which includes any one of the above memories and a controller that is coupled to the memory and used for controlling the memory to store data.

The beneficial effects of the present disclosure: in the present disclosure, by disposing bit lines and capacitor structures on the two opposite sides of the two ends of the active units, as compared with a semiconductor device with the same number of capacitor structures, the semiconductor device of the present disclosure can have larger spaces on the two sides of the ends of the active units to accommodate the capacitor structures, which is beneficial to increasing sizes of the capacitor structures, increasing the overall capacitance value of the semiconductor device, and improving the performance of the semiconductor device.

BRIEF DESCRIPTION OF THE DRAWINGS

The drawings needed in the description of implementations are briefly introduced as below for the purpose of illustrating the technical solutions in the implementations of the present disclosure more clearly. Apparently, the drawings described below are merely some implementations of the present disclosure. Those skilled in the art may obtain other drawings according to these drawings without creative work.

DETAILED DESCRIPTION

Figure 1:
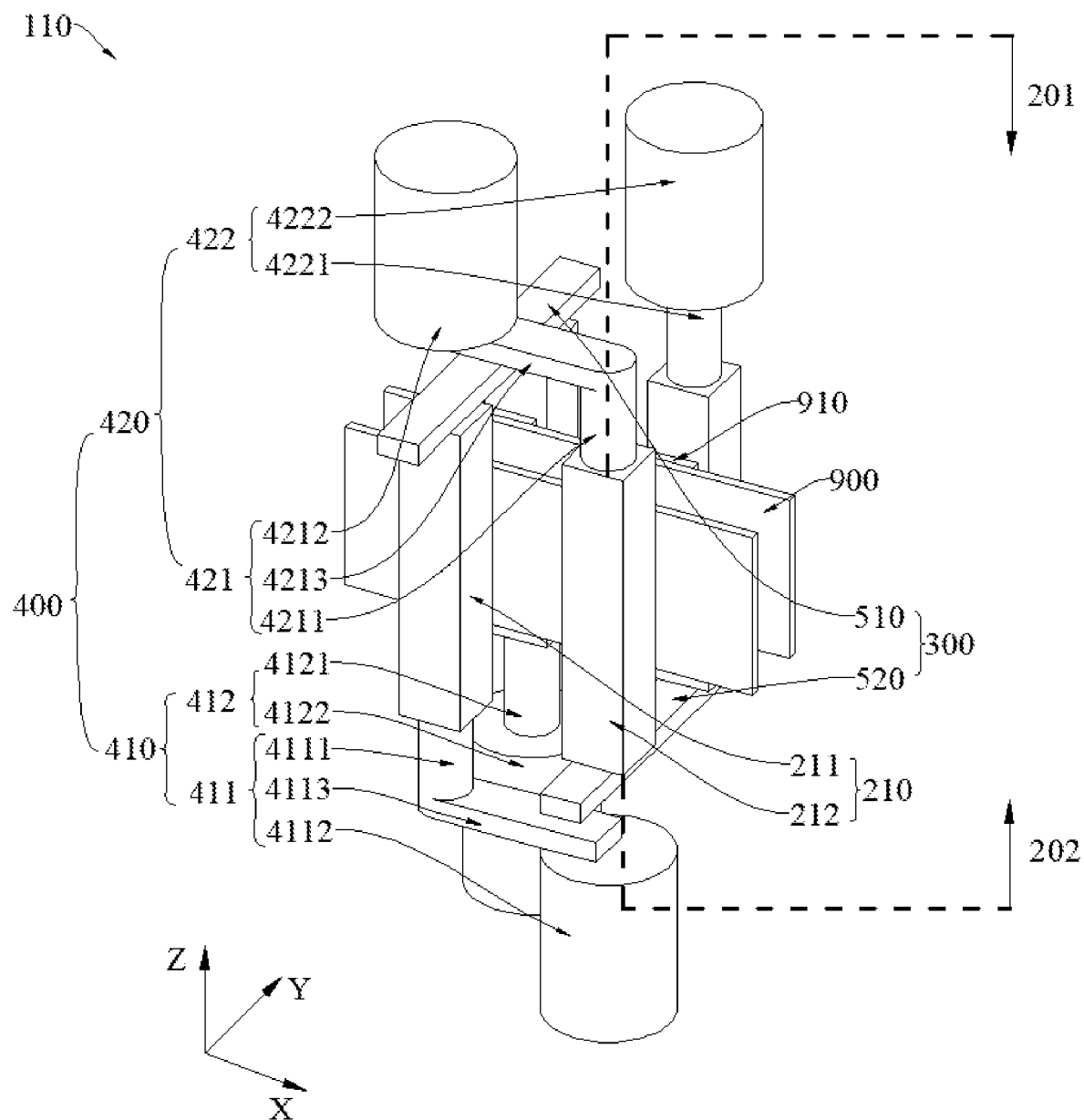
FIG. 1 is a schematic perspective view of a first structure of a semiconductor device provided by implementations of the present disclosure.

The technical solutions in implementations of the present disclosure will be described below clearly and completely with reference to the figures in the implementations of the present disclosure. Apparently, the described implementations are merely a part of the implementations of the present disclosure, rather than all of the implementations. Based on the implementations in the present disclosure, all other implementations obtained by those skilled in the art without creative work shall fall in the protection scope of the present disclosure. Furthermore, it should be understood that, the detailed description as described here is merely used to illustrate and explain the present disclosure, instead of limiting the present disclosure. In the present disclosure, unless otherwise stated, the directional terms used such as "up" and "down" generally refer to up and down in an actual using or working state of a device, particularly the page direction in the figures, while "inside" and "outside" refer to the profile of the device.

In recent years, in dynamic random memories, sizes of capacitor structures have a great influence on the overall capacitance value, and how to increase the overall capacitance value is a research topic of technicians.

Referring to FIGS. 1 to 9, implementations of the present disclosure provide a semiconductor device, including: an active layer including a plurality of active units 210 arranged in an array and disposed at intervals, the active layer having a first side 201 and a second side 202 at two ends of each of the active units 210; a bit line layer 300 including a first bit line sub-layer disposed on the first side 201 of the active layer and a second bit line sub-layer disposed on the second side 202 of the active layer, the first bit line sub-layer and the second bit line sub-layer being connected with the active units 210 respectively; and a plurality of capacitor structures 400 disposed on the first side 201 and the second side 202 of the active layer and connected with the active units 210 respectively.

In the present disclosure, by disposing the bit lines and the capacitor structures on the two opposite sides of the two ends of the active units, the semiconductor device of the present disclosure can have larger spaces on the two sides of the ends of the active units, as compared with a semiconductor device with the same number of capacitor structures, to accommodate the capacitor structures, which is beneficial to increasing sizes of the capacitor structures, increasing the overall capacitance value of the semiconductor device, and improving the performance of the semiconductor device.

The technical solution of the present disclosure is now described with reference to particular implementations.

It should be noted that, only local examples are shown in the figures of the present disclosure. However, in actual structures, for example, the number of active units, the number of bit lines in the bit line layer and the number of capacitor structures are not limited to this, and may be adjusted according to the actual situation.

Figure 2:
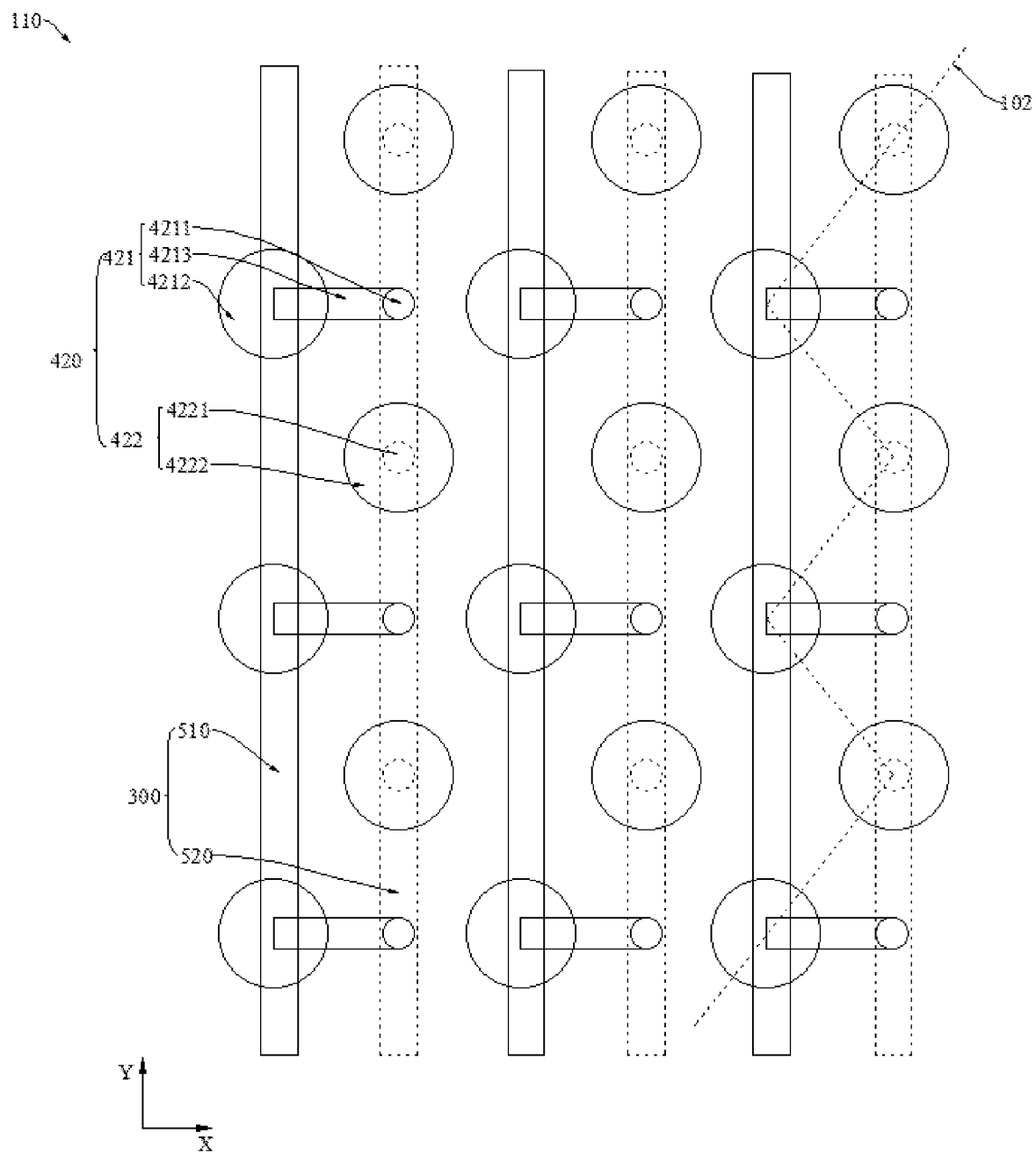
FIG. 2 is a schematic top view of FIG. 1 in a direction of a first side.

In an implementation, referring to FIGS. 1 and 2, a semiconductor device 110 can include an active layer, a bit line layer 300, and a plurality of capacitor structures 400. The active layer can include a plurality of active units 210 arranged in an array and disposed at intervals. The active layer can have a first side 201 and a second side 202 at two ends of each of the active units 210. The bit line layer 300 can include a first bit line sub-layer disposed on the first side 201 of the active layer and a second bit line sub-layer disposed on the second side 202 of the active layer. The first bit line sub-layer and the second bit line sub-layer can be connected with the active units 210 respectively. The capacitor structures 400 can be disposed on the first side 201 and the second side 202 of the active layer, and be connected with the two ends of the corresponding active units 210 respectively. It may be understood that, for ease of drawing, FIG. 1 shows that the first bit line sub-layer includes one first bit line 510 and the second bit line sub-layer includes one second bit line 520. In some implementations, the first bit line sub-layer can include any number of the first bit lines 510, and the second bit sub-layer can also include any number of the second bit lines 520.

Figure 7:
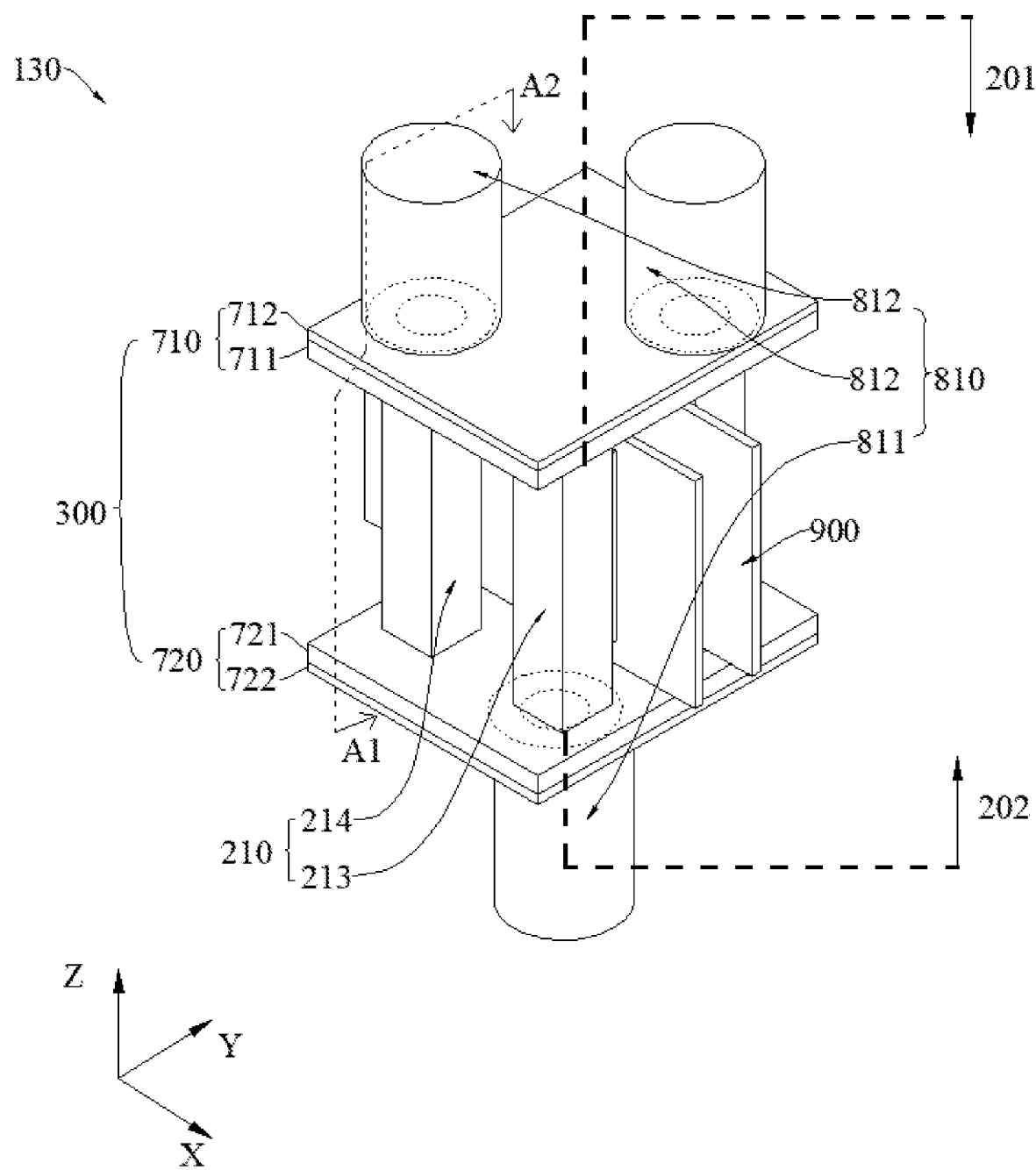
FIG. 7 is a schematic perspective view of a fourth structure of a semiconductor device provided by implementations of the present disclosure.
Figure 8:
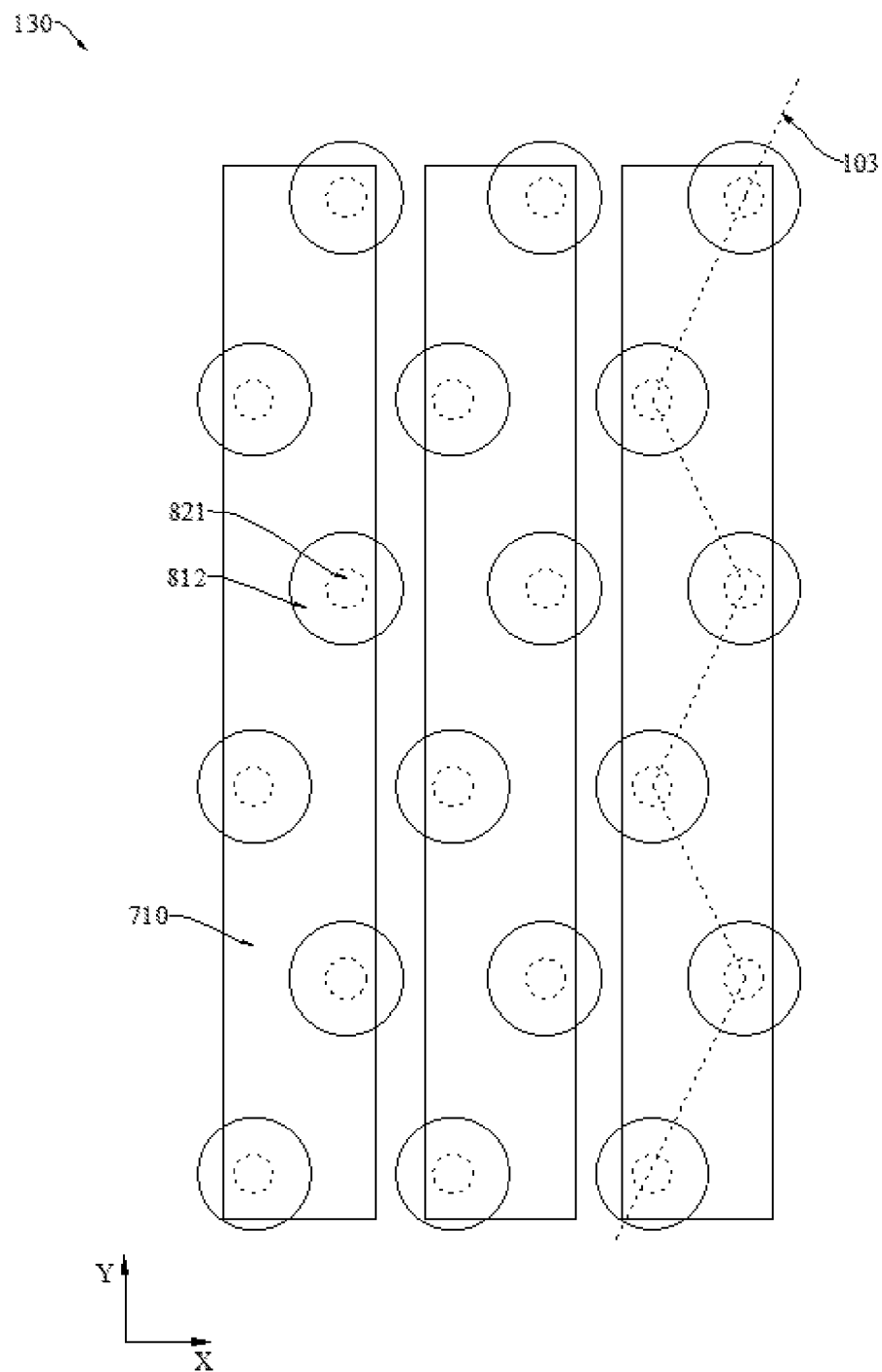
FIG. 8 is a schematic top view of FIG. 7 in a direction of a first side.

The semiconductor device can include a semiconductor device with a vertical gate transistor. Referring to FIGS. 1 and 2, the first bit line sub-layer can include first bit lines 510, the second bit line sub-layer can include second bit lines 520, an extending direction of the first bit lines 510 can be a first direction, and an extending direction of the second bit lines 520 can be the first direction. In another implementation, as shown in FIGS. 7 and 8, the first bit line sub-layer can include first bit line groups 710, the second bit line sub-layer can include second bit line groups 720, a direction of the first bit line groups 710 can be a first direction, and a direction of the second bit line groups 720 can be the first direction. In an implementation, a second direction can be perpendicular to the first direction and perpendicular to the extending direction of the active units 210, and the active units 210 can be disposed at intervals along the first direction and the second direction. For ease of description, in the figures the first direction is a direction of the Y axis, the second direction is a direction of the X axis, and the extending direction of the active units 210 is a direction of the Z axis.

The present disclosure finds that reasonable use of spaces to increase the sizes of the capacitor structures is a key point of improvement. The bit line layer 300 and the corresponding capacitor structures 400 can be disposed on two opposite sides of the ends of the active units 210. After the number of the capacitor structures 400 is determined, the semiconductor device 110 of the present disclosure may have larger spaces on the two sides of the ends of the active units 210 to accommodate the capacitor structures 400. For the pillar-shaped capacitor structures 400, on the premise of not changing heights, cross sectional areas of the pillar-shaped capacitor structures 400 on a plane formed by the X axis and the Y axis can be increased, so that side expanded areas of the pillar-shaped capacitor structures 400 along the direction of the Z axis are increased and side expanded facing areas of two electrodes of the pillar-shaped capacitor structures 400 along the direction of the Z axis are increased, which is beneficial to increasing the sizes of the capacitor structures 400, increasing the overall capacitance value of the semiconductor device 110, improving the degree of freedom of the capacitor arrangement, and improving the performance of the semiconductor device 110.

In some implementations, referring to FIG. 1, the ends of the active units 210 connected with the capacitor structures 400 are source ends 203, and the ends of the active units 210 connected with the bit line layer 300 are drain ends 204.

In some implementations, referring to FIGS. 1 and 2, the first bit line sub-layer can include first bit lines 510, the second bit line sub-layer can include second bit lines 520, an extending direction of the first bit lines 510 can be parallel to an extending direction of the second bit lines 520, and orthographic projections of the first bit lines 510 on the active layer can be disposed not to overlap with orthographic projections of the second bit lines 520 on the active layer.

In an implementation, the first bit lines 510 and the second bit lines 520 can be disposed on the first side 201 and the second side 202 of the active layer, respectively, so that the pitch between two adjacent ones of the first bit lines 510 may be increased and the requirement on line widths of the first bit lines 510 may be reduced, thereby reducing process difficulty. Accordingly, the process difficulty of the second bit lines 520 may be reduced, thereby reducing process cost.

In some implementations, referring to FIGS. 1 and 2, the orthographic projections of the first bit lines 510 on the active layer and the orthographic projections of the second bit lines 520 on the active layer can be disposed alternately.

In an implementation, the first bit lines 510 and the second bit lines 520 can be disposed alternately, which may facilitate wire trimming. The pitch between two adjacent ones of the first bit lines 510 and the pitch between two adjacent ones of the second bit lines 520 can be arranged regularly to facilitate a design of the capacitor structures 400.

In some implementations, referring to FIGS. 1 and 2, the active units 210 can include first active pillars 211 connected with the first bit lines 510 and second active pillars 212 connected with the second bit lines 520, the capacitor structures 400 can include first capacitor units 410 and second capacitor units 420, the first capacitor units 410 can be disposed on the second side 202 of the active layer, the second capacitor units 420 can be disposed on the first side 201 of the active layer, the first capacitor units 410 can be connected with the first active pillars 211, and the second capacitor units 420 can be connected with the second active pillars 212.

The first bit lines 510, the first active pillars 211 and the first capacitor units 410 can form a first group, and the second bit lines 520, the second active pillars 212 and the second capacitor units 420 can form a second group. In an implementation, the first bit lines 510 and the first capacitor units 410 can be located on the first side 201 and the second side 202 of the active layer respectively, the second bit lines 520 and the second capacitor units 420 can be located on the second side 202 and the first side 201 of the active layer respectively, and the first capacitor units 410 and the second capacitor units 420 can be disposed on the two sides of the ends of the active layer, which is beneficial to increasing the sizes of the capacitor structures 400, increasing the overall capacitance value of the semiconductor device 110, and improving the performance of the semiconductor device 110.

In some implementations, referring to FIGS. 1 and 2, the first capacitor units 410 can include first subunits 411 and second subunits 412, the first subunits 411 can include first contact plugs 4111, first lead portions 4113 and first capacitor portions 4112, the first contact plugs 4111 can be in contact connection with the first active pillars 211, the first capacitor portions 4112 can be connected with the first contact plugs 4111 through the first lead portions 4113, the second subunits 412 can include second contact plugs 4121 and second capacitor portions 4122, the second contact plugs 4121 can be in contact connection with the first active pillars 211, and the second capacitor portions 4122 can be connected with the first active pillars 211 through the second contact plugs 4121.

The first capacitor portions 4112 may be led to a direction with ample space by first leads and misaligned with the second capacitor portions 4122, to be beneficial to increasing sizes of the first capacitor portions 4112 and the second capacitor portions 4122, increasing the overall capacitance value of the semiconductor device 110, and improving the performance of the semiconductor device 110.

In some implementations, referring to FIGS. 1 and 2, the second capacitor units 420 can include third subunits 421 and fourth subunits 422, the third subunits 421 can include third contact plugs 4211, second lead portions 4213 and third capacitor portions 4212, the third contact plugs 4211 can be in contact connection with the second active pillars 212, the third capacitor portions 4212 can be connected with the third contact plugs 4211 through the second lead portions 4213, the fourth subunits 422 can include fourth contact plugs 4221 and fourth capacitor portions 4222, the fourth contact plugs 4221 can be in contact connection with the second active pillars 212, and the fourth capacitor portions 4222 can be connected with the second active pillars 212 through the fourth contact plugs 4221.

The third capacitor portions 4212 may be led to a direction with ample space by second leads and misaligned from the positions of the fourth capacitor portions 4222, to be beneficial to increasing sizes of the third capacitor portions 4212 and the fourth capacitor portions 4222, increasing the overall capacitance value of the semiconductor device 110, and improving the performance of the semiconductor device 110.

In some implementations, referring to FIGS. 1 and 2, an extending direction of the first contact plugs 4111 can be parallel to an extending direction of the first active pillars 211, and a plane where the first lead portions 4113 can be located is parallel to a plane where the first bit lines 510 are located, and an extending direction of the first lead portions 4113 can form an angle with an extending direction of the first bit lines 510. In an implementation, an extending direction of the second contact plugs 4121 can be parallel to the extending direction of the first active pillars 211. In another implementation, an extending direction of the third contact plugs 4211 can be parallel to an extending direction of the second active pillars 212, a plane where the second lead portions 4213 can be located is parallel to a plane where the second bit lines 520 are located, and an extending direction of the second lead portions 4213 can form an angle with an extending direction of the second bit lines 520. In various implementations, an extending direction of the fourth contact plugs 4221 can be parallel to the extending direction of the second active pillars 212.

In some implementations, the extending direction of the first lead portions 4113 can be perpendicular to the extending direction of the first bit lines 510, and the extending direction of the second lead portions 4213 can be perpendicular to the extending direction of the second bit lines 520.

In some implementations, referring to FIGS. 1 and 2, in orthographic projections of the first bit line sub-layer and the second bit line sub-layer on the active layer, leading-out directions of the respective first lead portions 4113 corresponding to the respective first bit lines 510 can be the same, leading-out directions of the respective second lead portions 4213 corresponding to the respective second bit lines 520 can be the same, and the leading-out directions of the first lead portions 4113 corresponding to the first bit lines 510 can be opposite to the leading-out directions of the second lead portions 4213 corresponding to the adjacent second bit lines 520.

The leading-out direction refers to a direction of a corresponding lead from the contact plugs to be away from the contact plugs. For example, the leading-out direction of the first leads can be a direction from the first contact plugs 4111 to the first capacitor portions 4112. By alternately disposing the leading-out directions of the first leads and the second leads, in a top view direction of the semiconductor device 110 the corresponding first capacitor units 410 on the first bit lines 510 can be arranged along a broken line, the corresponding second capacitor units 420 on the second bit lines 520 can be arranged along a broken line, and the first bit lines 510 and the adjacent second bit lines 520 and the corresponding structures may form a group and be in a regularly alternate arrangement, which is beneficial to increasing the sizes of the capacitor structures 400 on the one hand, and facilitating wire trimming and a design of the capacitor structures 400 on the other hand. In FIGS. 1 and 2, by taking the arrangement of the second capacitor units 420 as an example, the reference numeral 102 can be used to denote that the second capacitor units 420 are arranged along the broken line.

Figure 3:
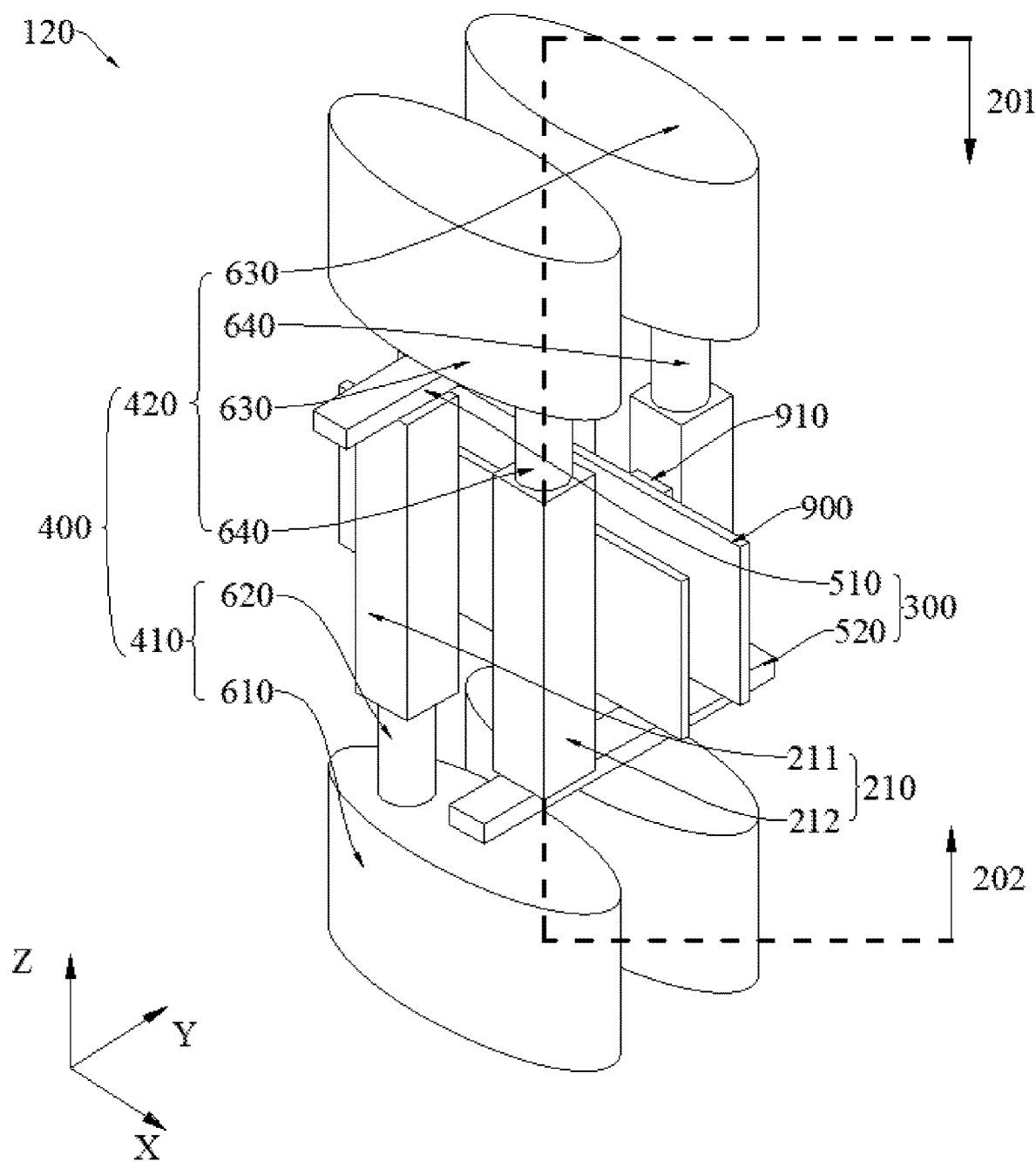
FIG. 3 is a schematic perspective view of a second structure of a semiconductor device provided by implementations of the present disclosure.
Figure 4:
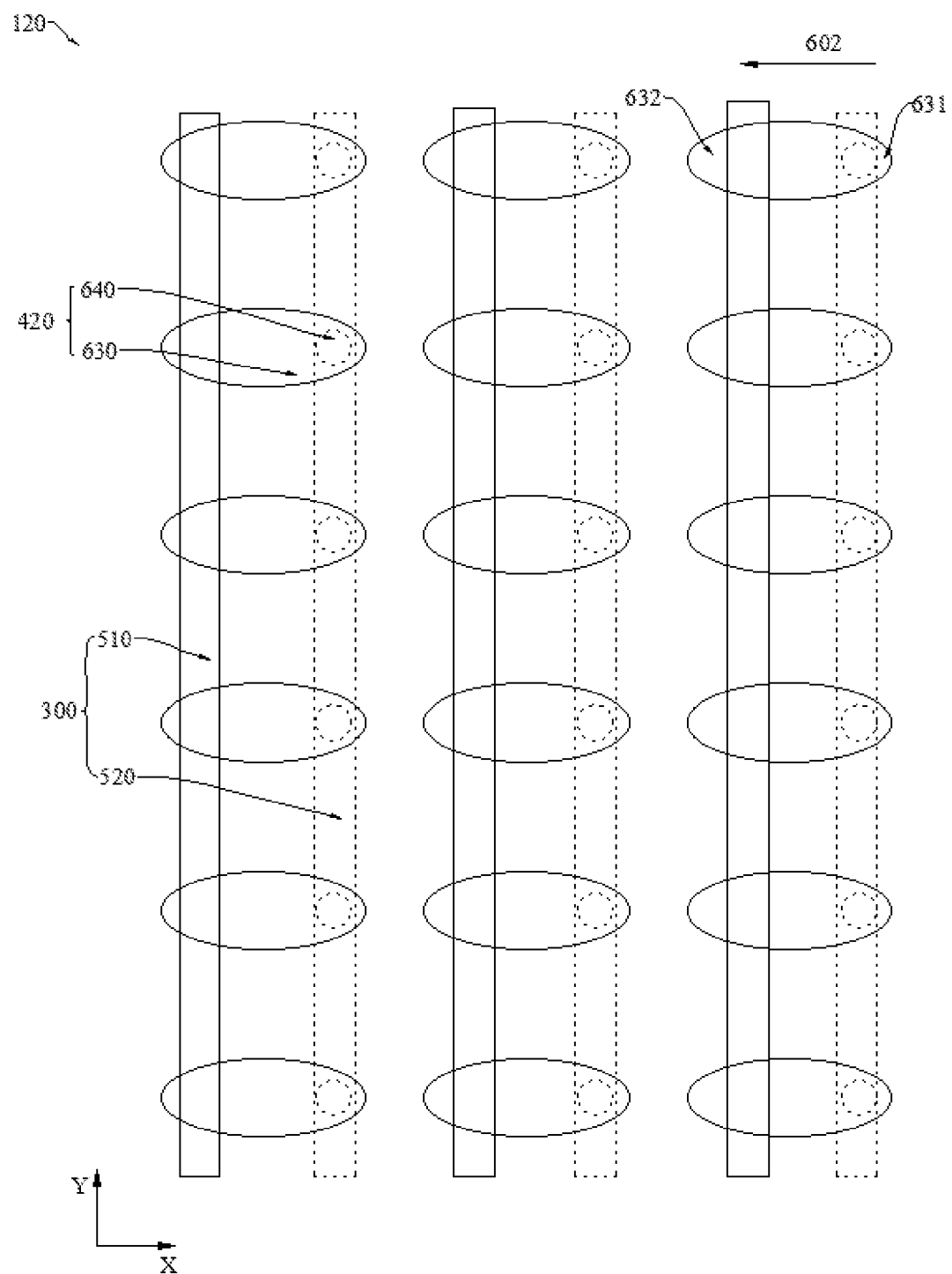
FIG. 4 is a schematic top view of FIG. 3 in a direction of a first side.

In some implementations, referring to FIGS. 3 and 4, orthographic projections of the first capacitor units 410 of the semiconductor device 120 on the active layer can overlap with the orthographic projections of both the first bit lines 510 and the second bit lines 520 on the active layer, and orthographic projections of the second capacitor units 420 on the active layer can overlap with both of the orthographic projections of both the first bit lines 510 and the second bit lines 520 on the active layer.

In a top view direction of the semiconductor device 120, the first capacitor units 410 may be below the second bit lines 520, and the second capacitor units 420 may be above the first bit lines 510. In an implementation, the first capacitor units 410 and the second capacitor units 420 can be expanded laterally parallel to the second direction. As the first bit lines 510 and the second capacitor units 420 can be disposed to be insulated from each other and the second bit lines 520 and the first capacitor units 410 can be disposed to be insulated from each other, no risk of electrical abnormality will be caused. Therefore, the sizes of the capacitor structures 400 and the overall capacitance value of the semiconductor device 120 can be increased, and the performance of the semiconductor device 120 can be improved.

In some implementations, referring to FIGS. 3 and 4, the first capacitor units 410 can include fifth capacitor portions 610 and fifth contact plugs 620, and the fifth contact plugs 620 can be in contact connection with the first active pillars 211, the fifth capacitor portions 610 can expand in a direction toward the adjacent second bit lines 520, and an expanding direction of the fifth capacitor portions 610 can be perpendicular to the extending direction of the second bit lines 520. In an implementation, the second capacitor units 420 can include sixth capacitor portions 630 and sixth contact plugs 640, the sixth contact plugs 640 can be in contact connection with the second active pillars 212, the sixth capacitor portions 630 can expand in a direction toward the adjacent first bit lines 510, and an expanding direction of the sixth capacitor portions 630 can be perpendicular to the extending direction of the first bit lines 510.

In an implementation, the capacitor units can be expanded laterally parallel to the second direction directly to make the fifth capacitor portions 610 and the sixth capacitor portions 630 expand laterally, thereby increasing the sizes of the capacitor structures 400, increasing the overall capacitance value of the semiconductor device 120, and improving the performance of the semiconductor device 120.

In some implementations, referring to FIGS. 3 and 4, the fifth capacitor portions 610 can include first ends connected with the fifth contact plugs 620 and second ends far away from the fifth contact plugs 620, and the sixth capacitor portions 630 can include third ends 631 connected with the sixth contact plugs 640 and fourth ends 632 far away from the sixth contact plugs 640. In an implementation, in the orthographic projections of the capacitor structures 400 on the active layer, a direction from the first ends to the second ends can be a first expanding direction, and a direction from the third ends 631 to the fourth ends 632 can be a second expanding direction 602. In an implementation, the first expanding directions of the two adjacent ones of first capacitor units 410 corresponding to the same first bit line 510 can be the same and the second expanding directions 602 of the two adjacent ones of second capacitor units 420 corresponding to the same second bit line 520 can also be the same, as shown in FIGS. 3 and 4. In another implementation, the first expanding directions of the two adjacent ones of first capacitor units 410 corresponding to the same first bit line 510 can be opposite and the second expanding directions 602 of the two adjacent ones of second capacitor units 420 corresponding to the same second bit line 520 can also be opposite, as shown in 5 and 6.

Figure 6:
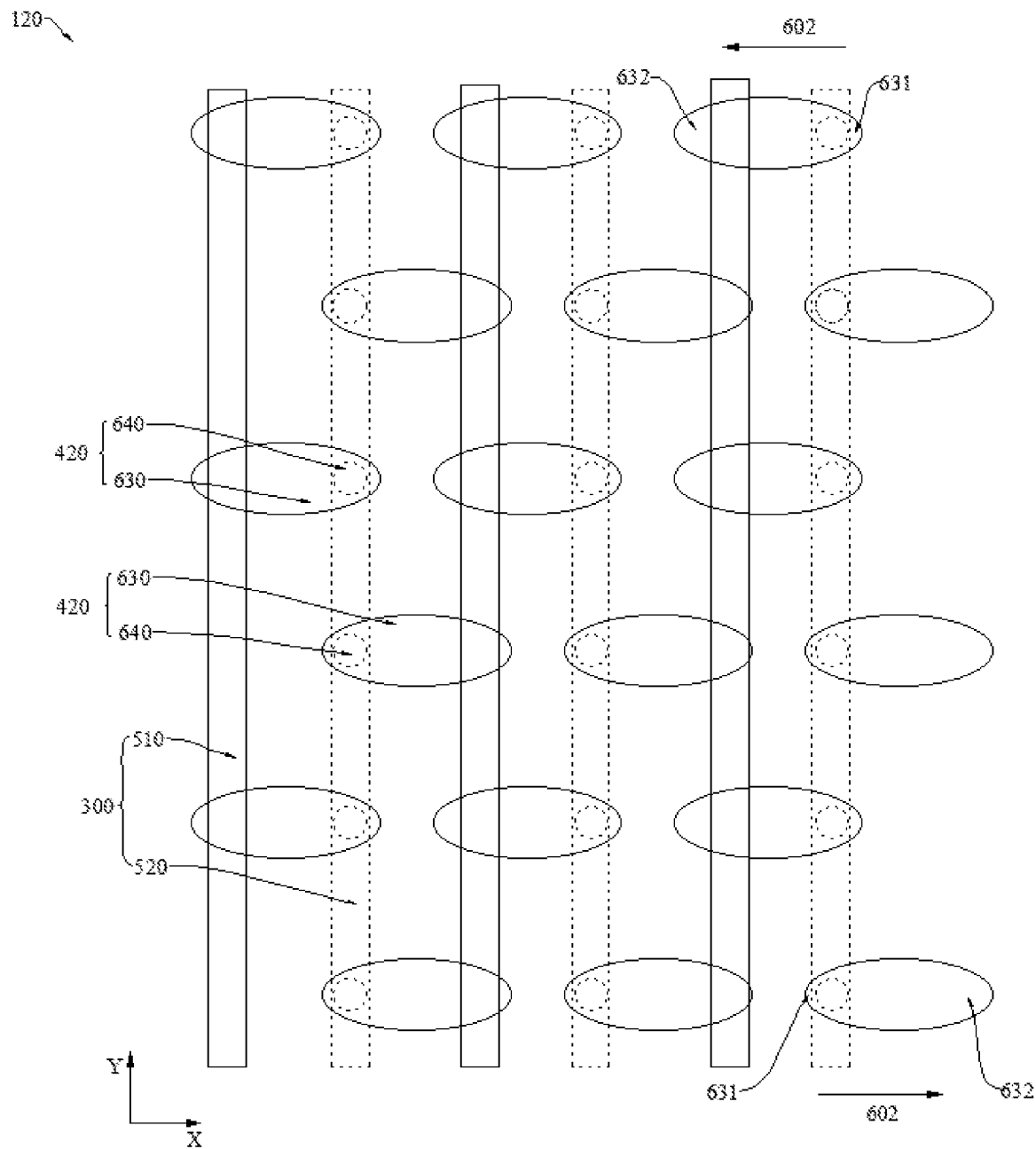
FIG. 6 is a schematic top view of FIG. 5 in a direction of a first side.

In FIGS. 4 and 6, it is easily understood that the figures are drawn by taking the second expanding direction 602 as an example.

In an implementation, the first expanding direction of the first capacitor units 410 can be an expanding direction of the fifth capacitor portions 610, and the second expanding direction 602 of the second capacitor units 420 can be an expanding direction of the sixth capacitor portions 630.

In an implementation, referring to FIGS. 3 and 4, the first expanding directions of the two adjacent ones of first capacitor units 410 corresponding to the same first bit line 510 of the semiconductor device 120 can be the same, the second expanding directions 602 of the two adjacent ones of second capacitor units 420 corresponding to the same second bit line 520 can be the same, and the fifth capacitor portions 610 and the sixth capacitor portions 630 can be arranged more regularly, which is beneficial to a capacitor arrangement design.

Figure 5:
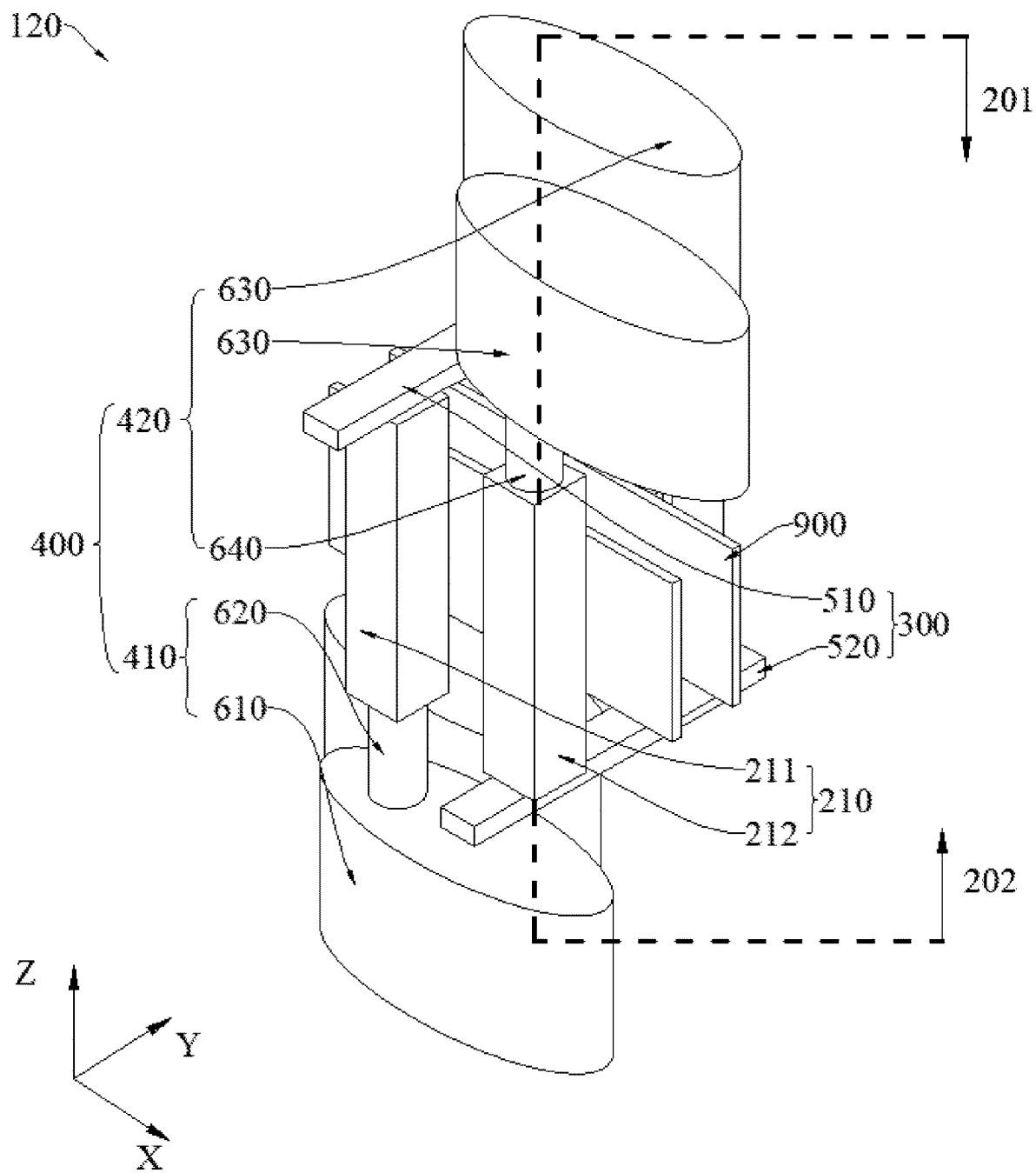
FIG. 5 is a schematic perspective view of a third structure of a semiconductor device provided by implementations of the present disclosure.

In another implementation, referring to FIGS. 5 and 6, the first expanding directions of the two adjacent ones of first capacitor units 410 corresponding to the same first bit line 510 of the semiconductor device 120 can be opposite, and the second expanding directions 602 of the two adjacent ones of second capacitor units 420 corresponding to the same second bit line 520 can also be opposite. By taking that the first expanding directions of the two adjacent ones of first capacitor units 410 corresponding to the same first bit line 510 are opposite as an example, the expanding direction of the fifth capacitor portions 610 is the positive direction of the X axis, and the expanding direction of the adjacent fifth capacitor portions 610 is the negative direction of the X axis; in the direction of the Y axis, the two adjacent ones of fifth capacitor portions 610 may have larger sizes along the Y axis; similarly, the sixth capacitor portions 630 may have larger sizes along the Y axis, thereby increasing the sizes of the capacitor structures 400, increasing the overall capacitance value of the semiconductor device 120, and improving the performance of the semiconductor device 120.

In some implementations, referring to FIGS. 3 to 6, the first expanding directions of the two adjacent ones of first capacitor units 410 corresponding to the two adjacent ones of first bit lines 510 of the semiconductor device 120 can be the same, and the second expanding directions 602 of the two adjacent ones of second capacitor units 420 corresponding to the two adjacent ones of second bit lines 520 can be the same.

In some implementations, referring to FIGS. 3 to 6, in the orthographic projections of the capacitor structures 400 and the bit line layer 300 of the semiconductor device 120 on the active layer, the sizes of the first capacitor units 410 in a direction perpendicular to the first bit lines 510 are larger than those of the first capacitor units 410 in a direction parallel to the first bit lines 510, and the sizes of the second capacitor units 420 in a direction perpendicular to the second bit lines 520 are larger than those of the second capacitor units 420 in a direction parallel to the second bit lines 520.

In an implementation, the first capacitor units 410 can expand to the positive direction or the negative direction of the X axis, the second capacitor units 420 can expand to the positive direction or the negative direction of the X axis, the fifth capacitor portions 610 can expand to the positive direction or the negative direction of the X axis, the sixth capacitor portions 630 can expand to the positive direction or the negative direction of the X axis. In a top view direction of the semiconductor device 120, cross sections of the fifth capacitor portions 610 and the sixth capacitor portions 630 can be ellipses, the long axes of the ellipses can be substantially parallel to the direction of the X axis, the short axes of the ellipses can be substantially parallel to the direction of the Y axis, and being substantially parallel means a difference within +5°.

In some implementations, referring to FIGS. 7 and 8, the first bit line sub-layer of the semiconductor device 130 can include first bit line groups 710, an extending direction of the first bit line groups 710 can be a first direction, and two columns of the active units 210 arranged alternately along the first direction can correspond to one of the first bit line groups 710. In an implementation, the second bit line sub-layer can include second bit line groups 720, an extending direction of the second bit line groups 720 can be the first direction, and two columns of the active units 210 arranged alternately along the first direction can correspond to one of the second bit line groups 720.

In an implementation, two columns of the active units 210 arranged along the direction of the Y axis can correspond to one of the first bit line groups 710, and two columns of the active units 210 arranged along the direction of the Y axis can correspond to one of the second bit line groups 720, to facilitate a design of the first bit line groups 710 and the second bit line groups 720. In another implementation, line widths of the first bit line groups 710 and the second bit line groups 720 may be set greater to reduce the process difficulty of the bit lines, thereby facilitating a corresponding design of the capacitor structures 400 and the bit line sub-layers.

In some implementations, referring to FIGS. 7 and 8, orthographic projections of the first bit line groups 710 of the semiconductor device 130 on the active layer can be disposed to overlap with orthographic projections of the second bit line groups 720 on the active layer.

In an implementation, the first bit line groups 710 and the second bit line groups 720 can correspond to the same two columns of active units 210 to further facilitate a design of the arrangement of the capacitor structure 400.

Figure 9:
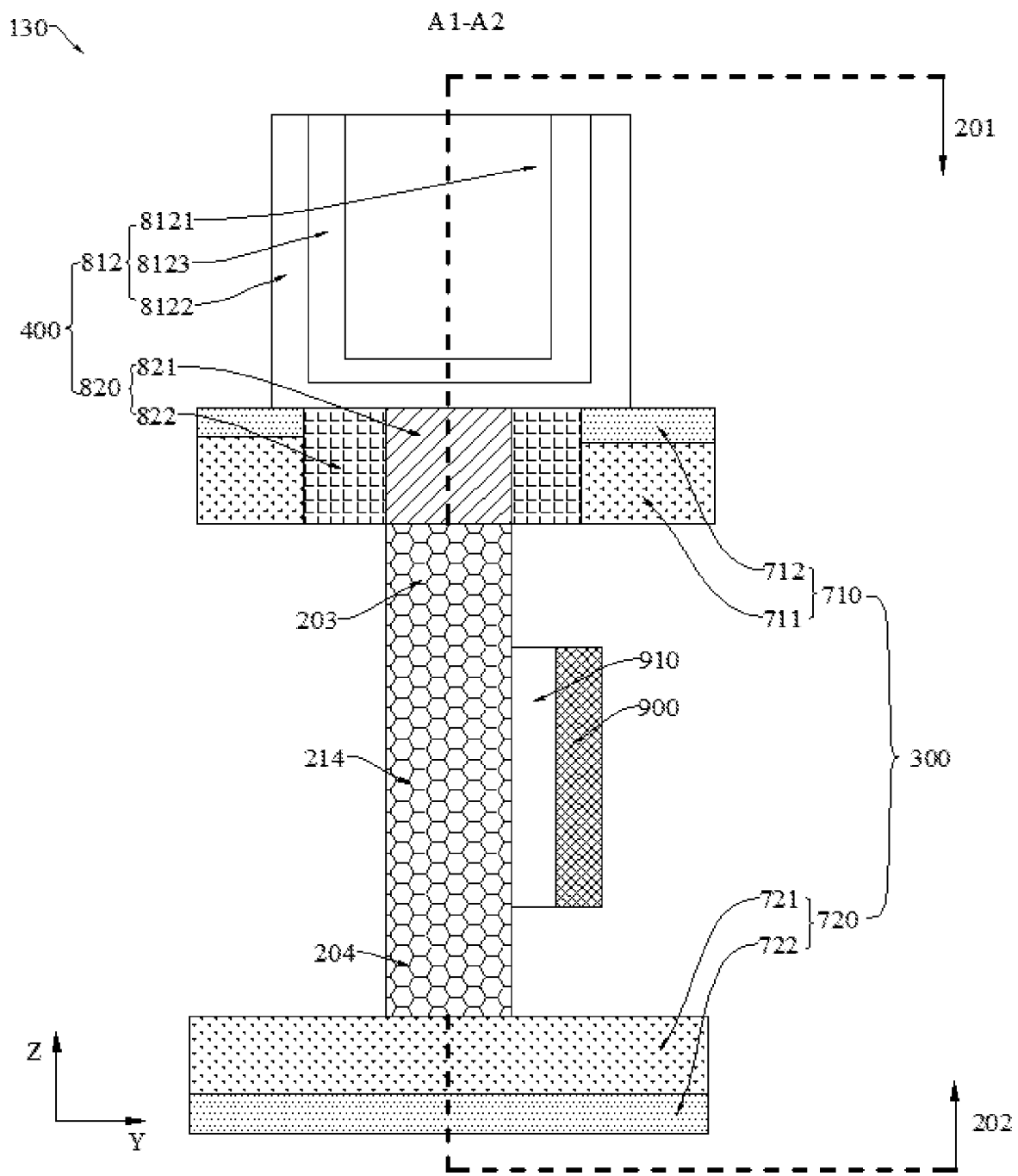
FIG. 9 is a schematic structural view of FIG. 7 along an A1-A2 section.

In some implementations, referring to FIGS. 7 to 9, the first bit line groups 710 of the semiconductor device 130 can include first insulating portions 712 and first conductor portions 711 disposed between the first insulating portions 712 and the active layer; the second bit line groups 720 can include second insulating portions 722 and second conductor portions 721 disposed between the second insulating portions 722 and the active layer, and the active units 210 connected to the first conductor portions 711 can be different from the active units 210 connected to the second conductor portions 721.

In an implementation, the active units 210 adjoined with the different conductor portions can be designed differently through the insulating portions and the conductor portions to avoid electrically abnormal connection of the active units 210.

In some implementations, referring to FIGS. 7 to 9, the capacitor structures 400 of the semiconductor device 130 can include capacitor components 810 and contact plug portions 820. In an implementation, the contact plug portions 820 can be disposed within the bit line layer 300 and include contact conductive sub-portions 821 and contact insulating sub-portions 822 between the contact conductive sub-portions 821 and the bit line layer 300, and the capacitor components 810 can be in contact connection with the active units 210 through the contact conductive sub-portions 821.

In an implementation, the ends of the active units 210 not required to be connected with the conductor portions can be insulated from one another through the contact insulating sub-portions 822, and the ends of the active units 210 not required to be connected with the conductor portions but required to be connected with the capacitor components 810 can be connected with the capacitor components 810 using the contact conductive sub-portions 821, thereby achieving a correct electrical connection of the active units 210.

In some implementations, referring to FIGS. 7 to 9, the active units 210 of the semiconductor device 130 can include first active pillars 213 connected with the first bit line groups 710 and second active pillars 214 connected with the second bit line groups 720, the capacitor components 810 can include seventh capacitor portions 811 and eighth capacitor portions 812, the seventh capacitor portions 811 can be disposed on the second side 202 of the active layer, the eighth capacitor portions 812 can be disposed on the first side 201 of the active layer, the seventh capacitor portions 811 can be connected with the first active pillars 213, and the eighth capacitor portions 812 can be connected with the second active pillars 214.

In an implementation, the first bit line groups 710, the first active pillars 213, the seventh capacitor portions 811 and the corresponding contact conductive sub-portions 821 can form a first group, and the second bit line groups 720, the second active pillars 214, the eighth capacitor portions 812 and the corresponding contact conductive sub-portions 821 can form a second group. In an implementation, the seventh capacitor portions 811 and the first bit line groups 710 can be disposed at two opposite ends of the first active pillars 213, and the eighth capacitor portions 812 and the second bit line groups 720 can be disposed at two opposite ends of the second active pillars 214, thereby normalizing the design, increasing sizes of the seventh capacitor portions 811 and the eighth capacitor portions 812, increasing the overall capacitance value of the semiconductor device 130, and improving the performance of the semiconductor device 130.

In some implementations, referring to FIGS. 7 to 9, a direction perpendicular to an extending direction of the first bit line groups 710 is a second direction, and the first active pillars 213 and the second active pillars 214 can be disposed alternately along the first direction and the second direction.

In a top view direction of the semiconductor device 130, the first active pillars 213 and the seventh capacitor portions 811 corresponding to one of the first bit line groups 710 can be arranged along a broken line, and the second active pillars 214 and the eighth capacitor portions 812 corresponding to one of the second bit line groups 720 can be arranged along a broken line. In FIGS. 7 to 9, by taking the arrangement of the eighth capacitor portions 812 as an example, the reference numeral 103 denotes that the eighth capacitor portions 812 are arranged along the broken line. However, currents in the first bit line groups 710 and the second bit line groups 720 will be transmitted along, for example, the direction of the Y axis.

In some implementations, the semiconductor device can further include a routing layer that is provided with a plurality of first vias and a plurality of second vias. The routing layer can be electrically connected with the first bit line sub-layer through the first vias and electrically connected with the second bit line sub-layer through the second vias.

In an implementation, circuit control for the first bit line sub-layer and the second bit line sub-layer can be achieved by connecting the first bit line sub-layer and the second bit line sub-layer with an external circuit through the routing layer.

In some implementations, referring to FIGS. 1 to 9, the semiconductor device 110, the semiconductor device 120 and the semiconductor device 130 each can further include word lines 900 disposed on sidewalls of the active units 210.

In some implementations, referring to FIGS. 1 to 9, an extending direction of the word lines 900 can intersect with an extending direction of the first bit lines 510 of the bit line sub-layers, or the extending direction of the word lines 900 can intersect with an extending direction of the first bit line groups 710 of the bit line sub-layers.

In an implementation, the word lines 900 can be made from a conductive material, including but not limited to, tungsten, cobalt, copper, aluminum, doped silicon, silicide, or a combination thereof.

In some implementations, the active units 210 may be made from a silicon-based material, or a polysilicon material, including, for example, homogeneous polysilicon or doped polysilicon. In an implementation, the active units 210 may further include at least one of semiconductor materials, such as polycrystalline germanium-silicon, carbon-silicon, germanium and the like.

In some implementations, the bit line layer 300 may be formed using conductive materials, which may include metal such as tungsten, titanium, aluminum, etc. In an implementation, the bit line layer 300 may be made from polysilicon, which has better conductive performance and better contact performance with an adjacent film layer as compared with other materials.

In some implementations, the first capacitor portions 4112, the second capacitor portions 4122, the third capacitor portions 4212, the fourth capacitor portions 4222, the fifth capacitor portions 610, the sixth capacitor portions 630, the seventh capacitor portions 811 and the eighth capacitor portions 812 can be all effective capacitor structures 400, any one of which may include a first capacitor electrode 8121, a capacitor dielectric layer 8123 enclosing the first capacitor electrode 8121, and a second capacitor electrode 8122 enclosing the capacitor dielectric layer 8123, and the second capacitor electrodes 8122 may be connected with the active units 210. It is readily understood that, FIGS. 7 and 9 are made by taking the eighth capacitor portions 812 as an example.

In some implementations, referring to FIGS. 1 to 9, filling layers 910 can be disposed between the active units 210 and the word lines 900, and filling layers 910 can be disposed for insulation between two structures that are not required to be electrically connected.

In some implementations, the filling layers 910 and all insulating film layers can include an insulating material, including at least one of silicon dioxide, silicon nitride and silicon oxynitride.

In the present disclosure, by disposing the bit lines and the capacitor structures on the two opposite sides of the two ends of the active units, as compared with a semiconductor device with the same number of capacitor structures, the semiconductor device of the present disclosure can have larger spaces on the two sides of the ends of the active units to accommodate the capacitor structures, which is beneficial to increasing sizes of the capacitor structures, increasing the overall capacitance value of the semiconductor device, and improving the performance of the semiconductor device.

Figure 10:
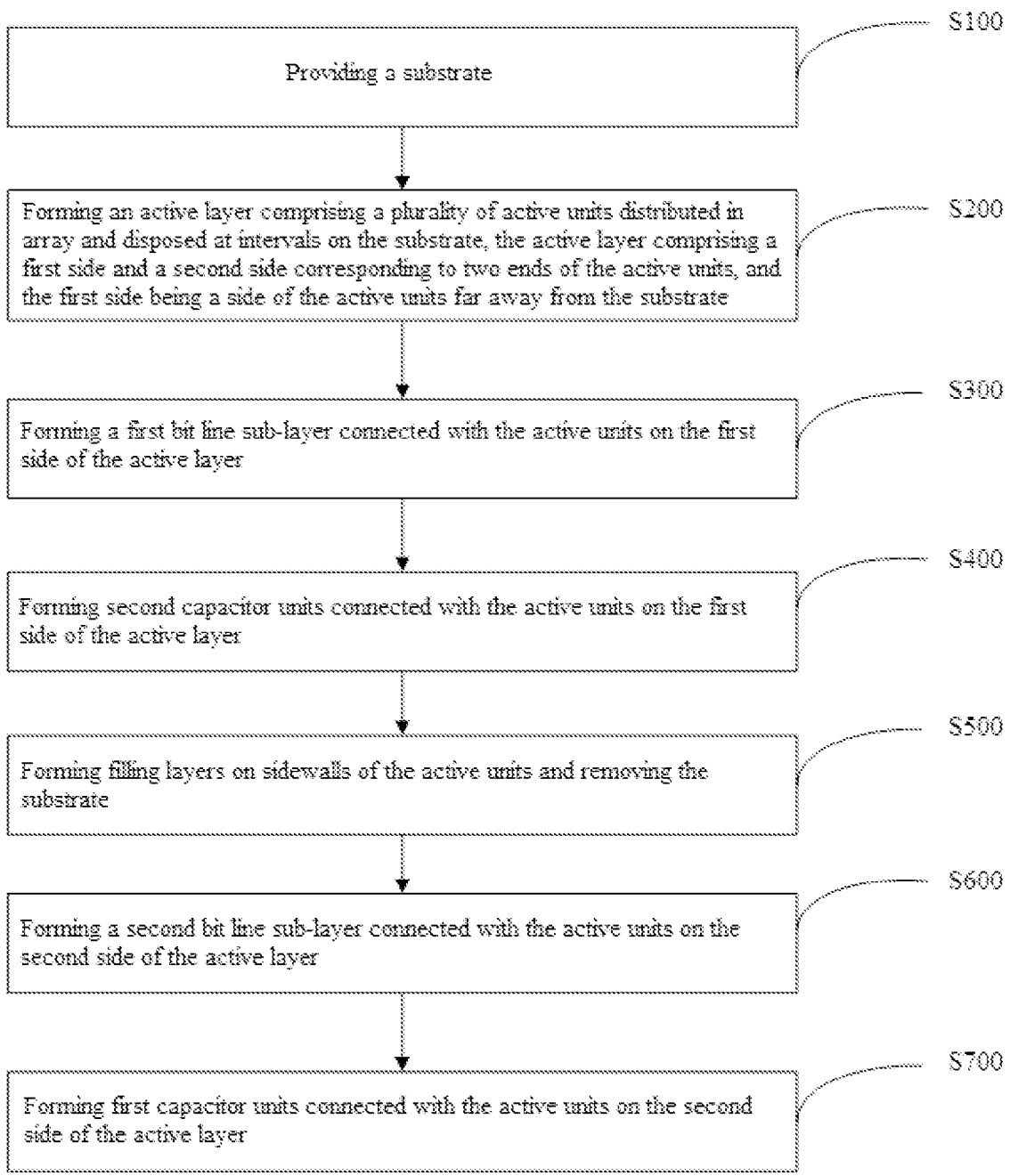
FIG. 10 is a flowchart of the steps of a fabrication method of a semiconductor device provided by implementations of the present disclosure.

Referring to FIG. 10, implementations of the present disclosure further provide a fabrication method of a semiconductor device. For example, the fabrication method can include steps S100 to S700.

At step S100, a substrate 101 is provided.

At step S200, an active layer is formed that includes a plurality of active units 210 arranged in an array and disposed at intervals on the substrate 101. In an implementation, the active layer has a first side 201 and a second side 202 corresponding to two ends of the active units 210, and the first side 201 is a side of the active units 210 far away from the substrate 101.

At step S300, a first bit line sub-layer is formed that is connected with the active units 210 on the first side 201 of the active layer.

At step S400, second capacitor units 420 are formed that are connected with the active units 210 on the first side 201 of the active layer.

At step S500, filling layers 910 are formed on sidewalls of the active units 210 and the substrate 101 is removed.

At step S600, a second bit line sub-layer is formed that is connected with the active units 210 on the second side 202 of the active layer.

At step S700, first capacitor units 410 are formed that are connected with the active units 210 on the second side 202 of the active layer.

In an implementation, the first bit line sub-layer can be connected with the first capacitor units 410 through the active units 210, and the second bit line sub-layer can be connected with the second capacitor units 420 through the active units 210.

In the present disclosure, by disposing the bit lines and the capacitor structures on the two opposite sides of the two ends of the active units, as compared with a semiconductor device with the same number of capacitor structures, the semiconductor device of the present disclosure can have larger spaces on the two sides of the ends of the active units to accommodate the capacitor structures, which is beneficial to increasing sizes of the capacitor structures, increasing the overall capacitance value of the semiconductor device, and improving the performance of the semiconductor device.

The technical solution of the present disclosure is now described with reference to particular implementations.

Figure 11A:
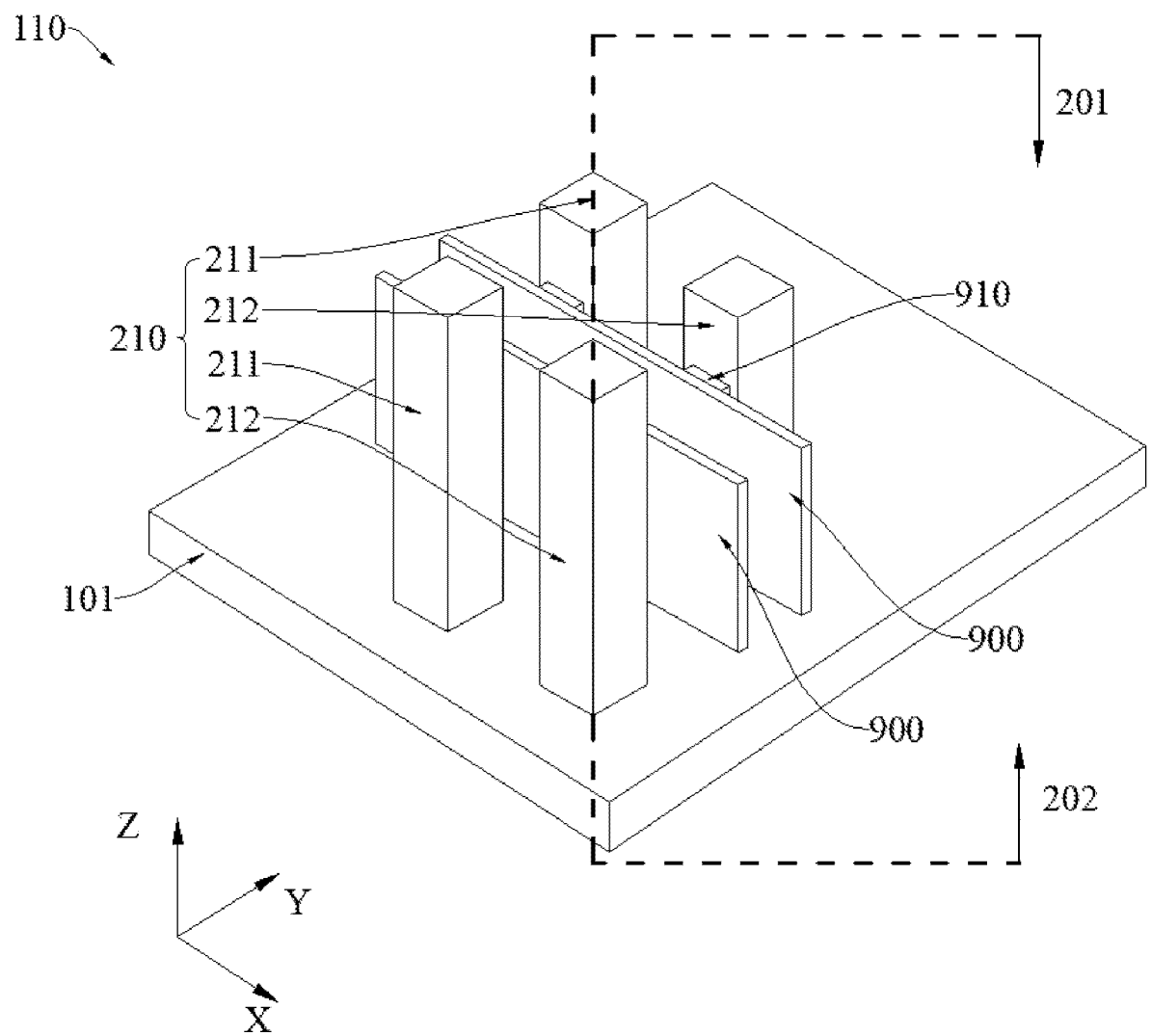
FIGS. 11A to 11C are schematic views of the flow of a fabrication method of a semiconductor device provided by implementations of the present disclosure.

In this implementation, it is readily understood that, the figures are made by taking the fabrication method of only one structure as an example and other structures can be easily imagined and are not drawn repeatedly in order to avoid simple repetition in a flowchart of the fabrication method. The fabrication method of the semiconductor device can include steps S100 to S700:

At step S100, a substrate 101 is provided, as shown in FIG. 11A.

In some implementations, the substrate 101 may be a rigid substrate 101, for example, a glass material, etc. The substrate 101 may also be a flexible substrate 101, for example, polyimide, etc.

At step S200, an active layer is formed that includes a plurality of active units 210 arranged in an array and disposed at intervals on the substrate 101. In an implementation, the active layer has a first side 201 and a second side 202 corresponding to two ends of the active units 210, and the first side 201 is a side of the active units 210 far away from the substrate 101, referring to FIG. 11A.

In some implementations, the active units 210 may be made from a silicon-based material, or a polysilicon material, including, for example, homogeneous polysilicon or doped polysilicon. In an implementation, the active units 210 may further include at least one of semiconductor materials, such as polycrystalline germanium-silicon, carbon-silicon, germanium and the like.

Figure 11B:
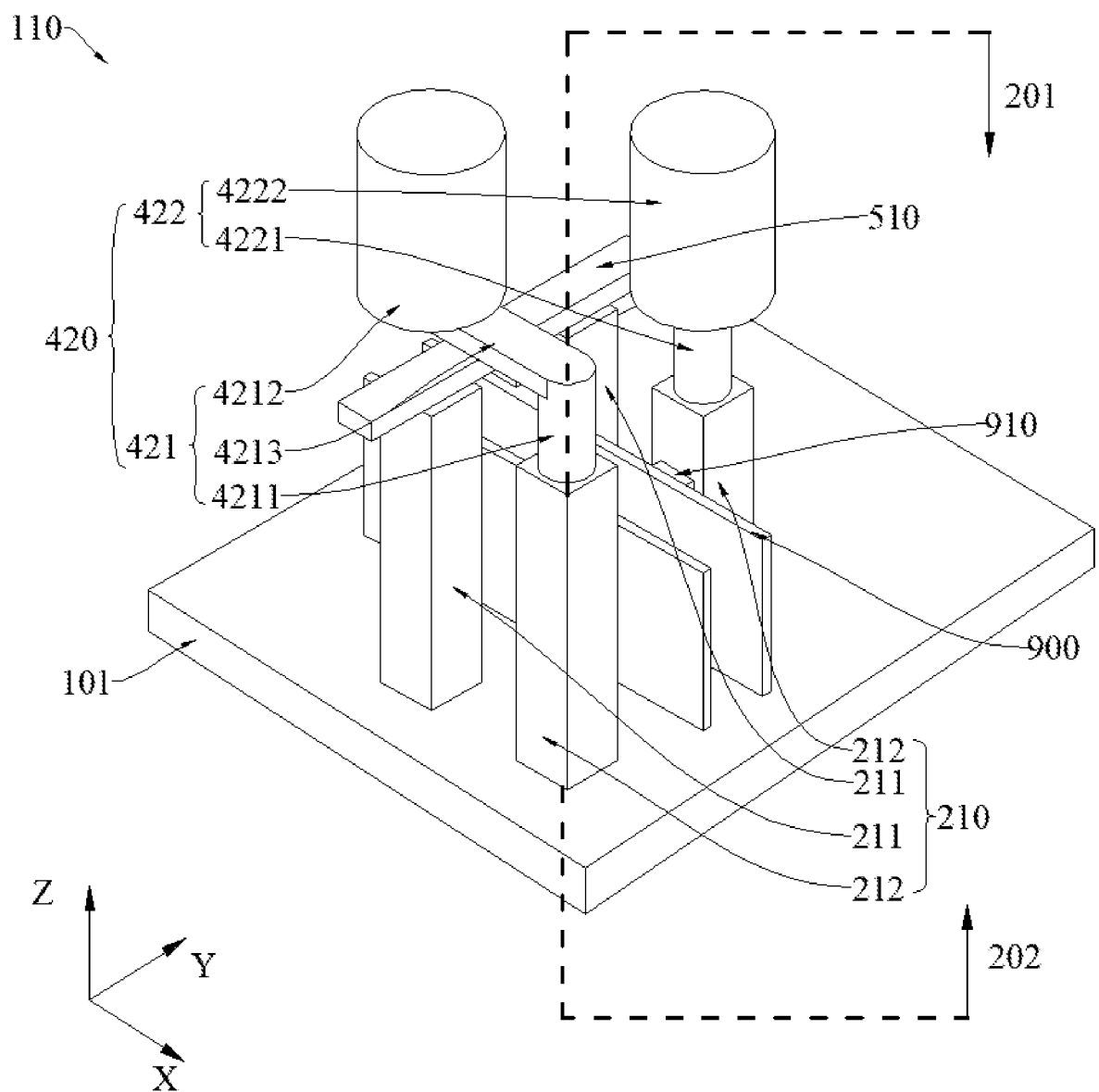

At step S300, a first bit line sub-layer is formed that is connected with the active units 210 on the first side 201 of the active layer, as shown in FIG. 11B.

In some implementations, for ease of description, the fabrication method may be divided into three classes, a, b, and c, according to different designs.

In some implementations, step S300 can include step S310a, at which first bit lines 510 are formed that are connected with the active units 210 on the first side 201 of the active layer, as shown in FIG. 11B.

In some implementations, step S300 can include step S310b, at which first bit lines 510 are formed that are connected with the active units 210 on the first side 201 of the active layer. In some implementations, step S300 can include S310c, at which first conductor portions 711 are formed that are disposed at intervals on the first side 201 of the active layer, and step 320c, at which first insulating portions 712 are formed that correspond to the first conductor portions 711 on the side of the first conductor portions 711 far away from the active layer to form first bit line groups 710, an extending direction of the first bit line groups 710 is a first direction, and two columns of the active units 210 arranged along the first direction correspond to one of the first bit line groups 710.

At step S400, second capacitor units 420 are formed that are connected with the active units 210 on the first side 201 of the active layer, as shown in FIG. 11B.

In some implementations, step S400 can include steps S410a, S420a and S430a.

At step S410a, third contact plugs 4211 and fourth contact plugs 4221 are formed that are connected with the active units 210 on the first side 201 of the active layer, as shown in FIG. 11B.

At step S420a, second leads are formed at ends of the third contact plugs 4211 far away from the active units 210, as shown in FIG. 11B.

At step S430a, third capacitor portions 4212 are formed that are connected with the second leads and fourth capacitor portions 4222 connected with the fourth contact plugs 4221 on the first side 201 of the active layer, as shown in FIG. 11B.

In some implementations, step S400 can include steps S410b and S420b.

At step S410b, sixth contact plugs 640 are formed that are connected with the active units 210 on the first side 201 of the active layer.

At step S420b, sixth capacitor portions 630 are formed on the side of the sixth contact plugs 640 far away from the active units 210.

In some implementations, step S400 can include steps S410c, S420c, S430c and S440c.

At step S410c, contact insulating sub-holes are formed that run through the first bit line groups 710 and expose the active units 210 in the first insulating portions 712.

At step S420c, an insulating material is filled within the contact insulating sub-holes to form the contact insulating sub-portions 822.

At step S430c, contact conductive sub-holes are formed that run through the contact insulating sub-portions 822 and expose the active units 210 in the contact insulating sub-portions 822.

At step S440c, a conductive material is filled within the contact conductive sub-holes to form the contact conductive sub-portions 821.

In an implementation, the ends of the active units 210 not required to be connected with the conductor portions can be insulated from one another through the contact insulating sub-portions 822, and the ends of the active units 210 not required to be connected with the conductor portions but required to be connected with the capacitor components 810 can be connected with the capacitor components 810 using the contact conductive sub-portions 821, thereby achieving a correct electrical connection of the active units 210.

Figure 11C:
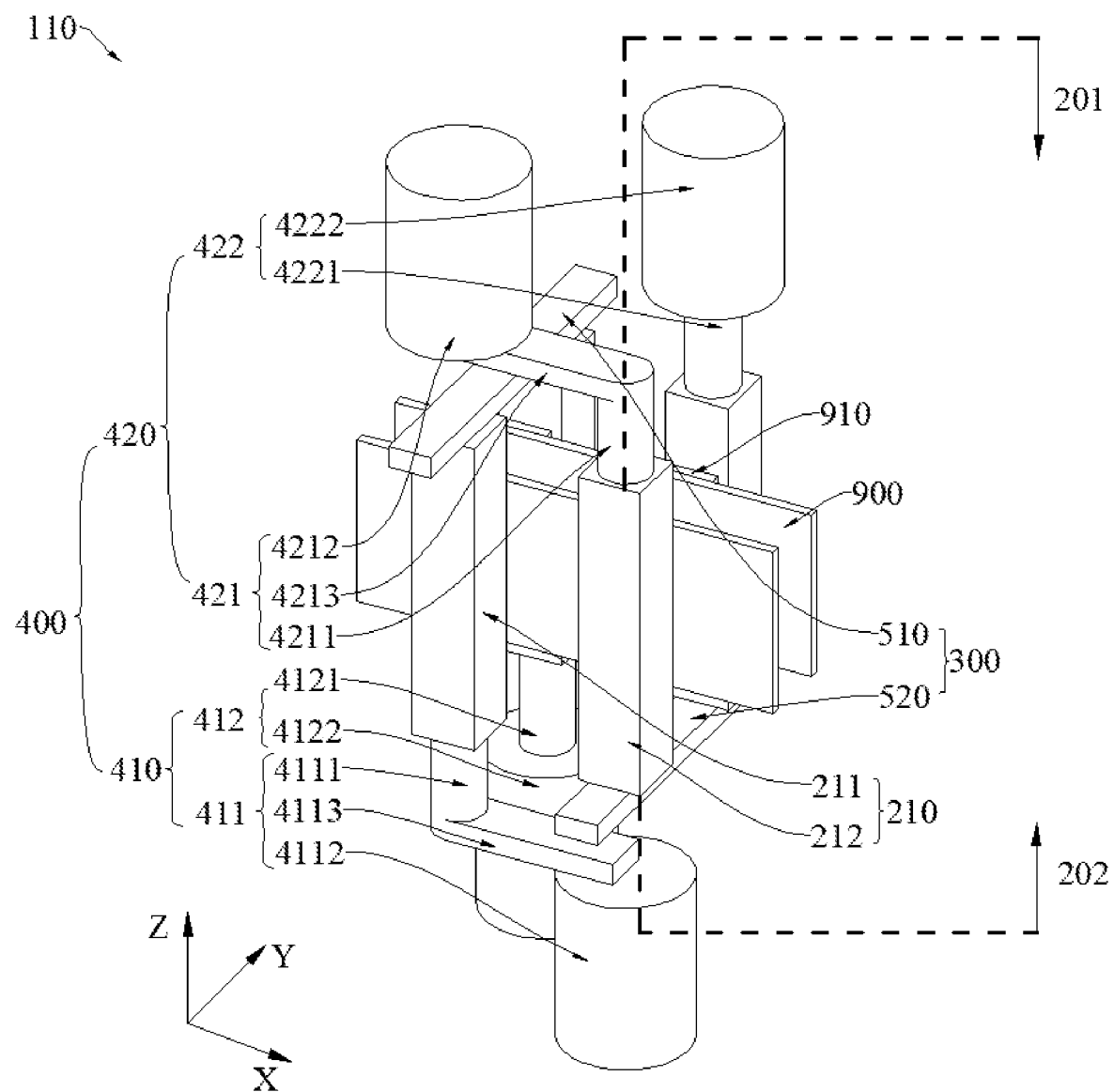

At step S500, filling layers 910 are formed on sidewalls of the active units 210 and removing the substrate 101, as shown in FIG. 11C.

In some implementations, step S500 can include forming filling layers 910 between adjacent ones of the active units 210 and removing the substrate 101, as shown in FIG. 11C.

In some implementations, referring to FIGS. 1 to 9, the semiconductor device 110, the semiconductor device 120 and the semiconductor device 130 each can further include word lines 900 disposed on the sidewalls of the active units 210.

In some implementations, referring to FIGS. 1 to 9, an extending direction of the word lines 900 can intersect with an extending direction of the first bit lines 510 of the bit line sub-layers, or the extending direction of the word lines 900 can intersect with an extending direction of the first bit line groups 710 of the bit line sub-layers.

In an implementation, the word lines 900 can be made from a conductive material, including but not limited to, tungsten, cobalt, copper, aluminum, doped silicon, silicide, or a combination thereof.

In some implementations, referring to FIGS. 1 to 9, filling layers 910 can be disposed between the active units 210 and the word lines 900, and filling layers 910 can be disposed for insulation between two structures that are not required to be electrically connected.

At S600, a second bit line sub-layer is formed that is connected with the active units 210 on the second side 202 of the active layer, as shown in FIG. 1C.

In some implementations, step S600 can include step S610a, at which second bit lines 520 are formed that are connected with the active units 210 on the second side 202 of the active layer, as shown in FIG. 11C.

In some implementations, step S600 can include step S610b, at which second bit lines 520 are formed that are connected with the active units 210 on the second side 202 of the active layer.

In some implementations, referring to FIGS. 3 and 4, an extending direction of the first bit lines 510 can be parallel to an extending direction of the second bit lines 520, and orthographic projections of the first bit lines 510 on the active layer can be disposed not to overlap with orthographic projections of the second bit lines 520 on the active layer.

In some implementations, referring to FIGS. 3 and 4, the orthographic projections of the first bit lines 510 on the active layer and the orthographic projections of the second bit lines 520 on the active layer can be disposed alternately.

In some implementations, step S600 can include steps S610c and S620c.

At step S610c, second conductor portions 721 are formed that are disposed at intervals on the second side 202 of the active layer.

At step S620c, second insulating portions 722 are formed that correspond to the second conductor portions 721 on the side of the second conductor portions 721 far away from the active layer to form the second bit line groups 720, one of the first bit line groups 710 is disposed to correspond to one of the second bit line groups 720, an extending direction of the second bit line groups 720 is a first direction, and two columns of the active units 210 are arranged along the first direction corresponding to one of the second bit line groups 720.

In some implementations, referring to FIGS. 7 to 9, one of the first bit line groups 710 and one of the second bit line groups 720 can correspond to the same two columns of the active units 210 arranged in the first direction.

At step S700, first capacitor units 410 are formed that are connected with the active units 210 on the second side 202 of the active layer, as shown in FIG. 11C.

In some implementations, step S700 can include steps S710a, S720a and S730a.

At step S710a, first contact plugs 4111 and second contact plugs 4121 are formed that are connected with the active units 210 on the second side 202 of the active layer, as shown in FIG. 11C.

At step S720a, first leads are formed at ends of the first contact plugs 4111 far away from the active units 210, as shown in FIG. 11C.

At step S730a, first capacitor portions 4112 are formed that are connected with the first leads and second capacitor portions 4122 are formed that are connected with the second contact plugs 4121 on the second side 202 of the active layer, as shown in FIG. 11C.

In some implementations, referring to FIGS. 1 and 2, the active units 210 can include first active pillars 211 connected with the first bit lines 510 and second active pillars 212 connected with the second bit lines 520, the capacitor structures 400 can include first capacitor units 410 and second capacitor units 420, the first capacitor units 410 can be disposed on the second side 202 of the active layer, the second capacitor units 420 can be disposed on the first side 201 of the active layer, the first capacitor units 410 can be connected with the first active pillars 211, and the second capacitor units 420 can be connected with the second active pillars 212.

In some implementations, referring to FIGS. 1 and 2, in orthographic projections of the first bit line sub-layer and the second bit line sub-layer on the active layer, leading-out directions of the respective first lead portions 4113 corresponding to the respective first bit lines 510 can be the same, and leading-out directions of the respective second lead portions 4213 corresponding to the respective second bit lines 520 can be the same, and the leading-out directions of the first lead portions 4113 corresponding to the first bit lines 510 can be opposite to the leading-out directions of the second lead portions 4213 corresponding to the adjacent second bit lines 520.

In some implementations, step S700 can include steps S710b and S720b.

At step S710b, fifth contact plugs 620 are formed that are connected with the active units 210 on the second side 202 of the active layer.

At step S720b, fifth capacitor portions 610 are formed on the side of the fifth contact plugs 620 far away from the active units 210.

In some implementations, referring to FIGS. 3 to 6, the fifth capacitor portions 610 can expand in a direction toward the adjacent first bit lines 510, and an expanding direction of the fifth capacitor portions 610 can be perpendicular to an extending direction of the first bit lines 510. In an implementation, the sixth capacitor portions 630 can expand in a direction toward the adjacent second bit lines 520, and an expanding direction of the sixth capacitor portions 630 can be perpendicular to an extending direction of the second bit lines 520.

In some implementations, referring to FIGS. 3 to 6, the first capacitor units 410 can include fifth capacitor portions 610 and fifth contact plugs 620, the fifth contact plugs 620 can be in contact connection with the first active pillars 211, the fifth capacitor portions 610 can expand in a direction toward the adjacent first bit lines 510, and an expanding direction of the fifth capacitor portions 610 can be perpendicular to an extending direction of the first bit lines 510. In an implementation, the second capacitor units 420 can include sixth capacitor portions 630 and sixth contact plugs 640, the sixth contact plugs 640 can be in contact connection with the second active pillars 212, the sixth capacitor portions 630 can expand in a direction toward the adjacent second bit lines 520, and an expanding direction of the sixth capacitor portions 630 is perpendicular to an extending direction of the second bit lines 520.

In some implementations, referring to FIGS. 3 and 4, the first expanding directions of the two adjacent ones of first capacitor units 410 corresponding to the same first bit line 510 can be the same, and the second expanding directions 602 of the two adjacent ones of second capacitor units 420 corresponding to the same second bit line 520 can be the same. In another implementation, referring to FIGS. 5 and 6, the first expanding directions of the two adjacent ones of first capacitor units 410 corresponding to the same first bit line 510 can be opposite, and the second expanding directions 602 of the two adjacent ones of second capacitor units 420 corresponding to the same second bit line 520 can be opposite.

In some implementations, step S700 can include steps S710c, S720c, S730c and S740c.

At step S710c, contact insulating sub-holes are formed that rung through the second bit line groups 720 and expose the active units 210 in the second insulating portions 722.

At step S720c, an insulating material is filled within the contact insulating sub-holes to form the contact insulating sub-portions 822.

At step S730c, contact conductive sub-holes are formed that run through the contact insulating sub-portions 822 and expose the active units 21 in the contact insulating sub-portions 822.

At step S740c, a conductive material is filled within the contact conductive sub-holes to form the contact conductive sub-portions 821.

In some implementations, referring to FIGS. 7 to 9, the active units 210 can include first active pillars 213 connected with the first bit line groups 710 and second active pillars 214 connected with the second bit line groups 720, the capacitor components 810 can include seventh capacitor portions 811 and eighth capacitor portions 812, the seventh capacitor portions 811 can be disposed on the second side 202 of the active layer, the eighth capacitor portions 812 can be disposed on the first side 201 of the active layer, the seventh capacitor portions 811 can be connected with the first active pillars 213, and the eighth capacitor portions 812 can be connected with the second active pillars 214.

In some implementations, referring to FIGS. 7 to 9, a direction perpendicular to an extending direction of the first bit line groups 710 is a second direction, and the first active pillars 213 and the second active pillars 214 can be disposed alternately along the first direction and the second direction.

In the present disclosure, by disposing the bit lines and the capacitor structures on the two opposite sides of the two ends of the active units, as compared with a semiconductor device with the same number of capacitor structures, the semiconductor device of the present disclosure can have larger spaces on the two sides of the ends of the active units to accommodate the capacitor structures, which is beneficial to increasing sizes of the capacitor structures, increasing the overall capacitance value of the semiconductor device, and improving the performance of the semiconductor device.

Figure 12:
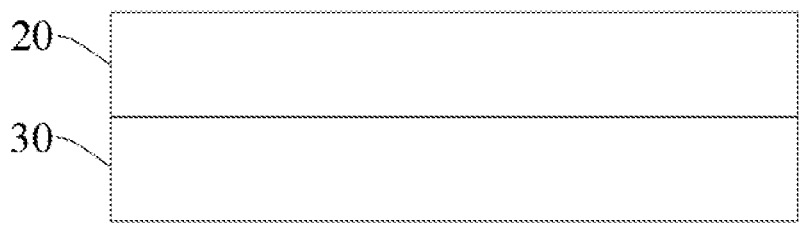
FIG. 12 is a schematic structural view of a memory provided by implementations of the present disclosure.

Referring to FIG. 12, implementations of the present disclosure further provide a memory 10 which can include a memory chip 20 and a periphery circuit chip 30. In an implementation, the periphery circuit chip 30 can be electrically connected with the memory chip 20, and store data into or read data from the memory chip 20. In some implementations, the memory chip 20 and/or the periphery circuit chip 30 may include the semiconductor device of any of the above implementations.

In an implementation, the memory 10 may be a three-dimensional memory (for example, a 3D NAND memory). It may be understood that, a memory provided by the implementations of the present disclosure, as being disposed with the semiconductor device provided by the implementations of the present disclosure, has the same beneficial effects as the semiconductor device above.

Figure 13:
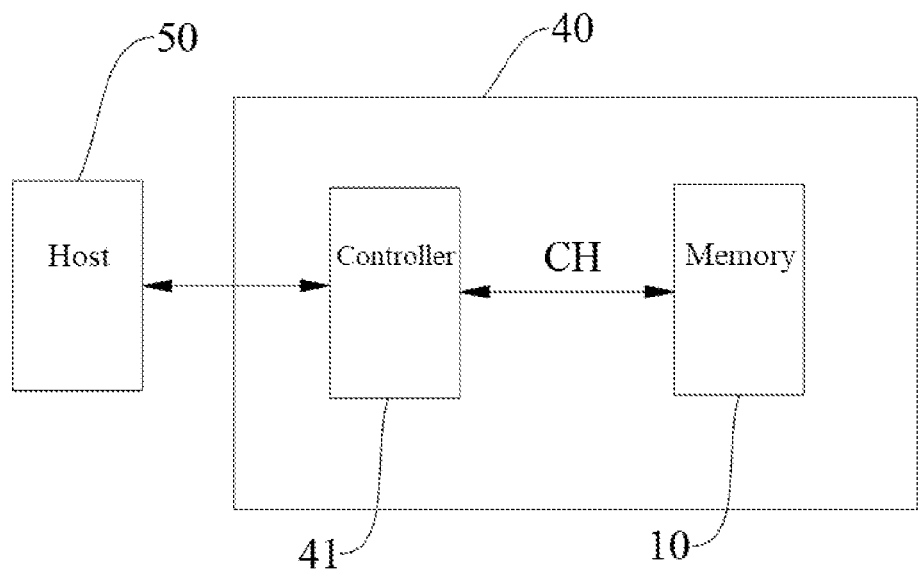
FIG. 13 is a schematic structural view of a storage system provided by implementations of the present disclosure.

Referring to FIG. 13, implementations of the present disclosure further provide a storage system 40 which can include a controller 41 and the memory 10 of any of the above implementations. In an implementation, the controller 41 can be coupled to the memory 10 and used for controlling the memory 10 to store data.

In an implementation, the controller 41 may control the memory 10 through a channel CH, and the memory 10 may perform operations based on the control of the controller 41 in response to a request from a host 50. For example, the memory 10 may receive a command CMD and an address ADDR from the controller 41 through the channel CH, and access a region selected from a memory cell array in response to the address. In other words, the memory 10 may perform an internal operation corresponding to the command on the region selected by the address.

In some implementations, the storage system 40 may be implemented as, for example, a universal flash storage (UFS) device, a solid state drive (SSD), a multimedia card in MMC, eMMC, RS-MMC and micro-MMC forms, a security digital card in SD, mini-SD and micro-SD forms, a memory device of a Personal Computer Memory Card International Association (PCMCIA) card type, a memory device of a Peripheral Component Interconnect (PCI) type, a memory device of a PCI Express (PCI-E) type, a compact flash (CF) card, a smart media card, or a memory stick, or the like.

In an implementation, the storage system 40 may be used on end products, such as computers, televisions, set-top boxes, vehicle-mounted products, or the like.

According to the storage system provided by this implementation, in the fabrication process, first etching blocking material layers are disposed on inner walls on the side of gate line slit holes far away from the bottom of a deck to reduce the etching amount of the corresponding inner walls, and the top select gate layers not covered by the first etching blocking material layers within the gate line slit holes are reduced by wet etching processing to increase apertures on the side close to the bottom of the deck, so that during formation of insulating portions, the disposed amount of the insulating portions can be increased, and the risk that the insulating portions are laterally dug through is reduced, and the top select gate layers are protected, and the performance of the semiconductor device is improved.

Figure 14:
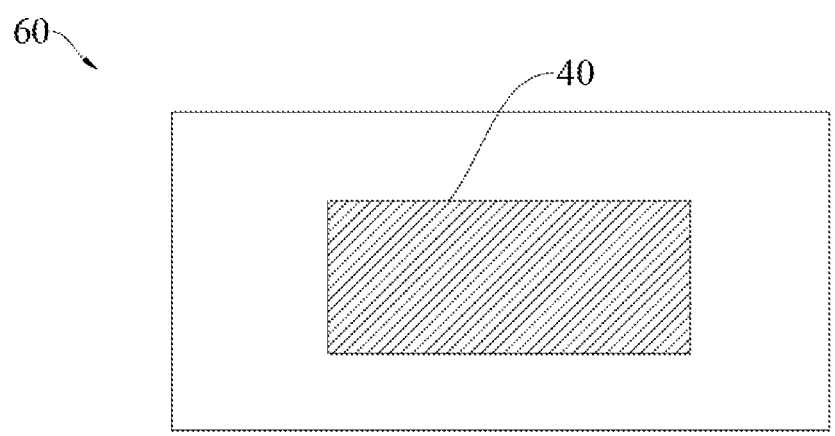
FIG. 14 is a schematic structural view of an electronic apparatus provided by implementations of the present disclosure.

Referring to FIG. 14, implementations of the present disclosure further provide an electronic apparatus 60 which can include the above storage system 40 provided by the implementations of the present disclosure. In an implementation, the electronic apparatus 60 may be any apparatus capable of storing data, such as a mobile phone, a desktop computer, a tablet, a notebook, a server, a vehicle-mounted apparatus, a wearable apparatus, a mobile power supply, or the like.

The electronic apparatus provided by the implementations of the present disclosure, as being disposed with the storage system provided by the implementations of the present disclosure, has the same beneficial effects as the above storage system.

Implementations of the present disclosure provide a semiconductor device, a memory and a storage system. The semiconductor device can include an active layer, a bit line layer and capacitor structures. The active layer can include a plurality of active units that are arranged in an array and disposed at intervals. The active layer has a first side and a second side. The bit line layer can include a first bit line sub-layer disposed on the first side and a second bit line sub-layer disposed on the second side. The first bit line sub-layer and the second bit line sub-layer can be connected with the active units respectively. The capacitor structures can be disposed on the first side and the second side of the active layer and connected with the active units respectively. In the present disclosure, by disposing the bit lines and the capacitor structures on two opposite sides of two ends of the active units, as compared with a semiconductor device with the same number of capacitor structures, the semiconductor device of the present disclosure may have spaces on the two sides of the ends of the active units to accommodate the capacitor structures, which is beneficial to increasing sizes of the capacitor structures, increasing the overall capacitance value of the semiconductor device, and improving the performance of the semiconductor device.

A semiconductor device, a memory and a storage system provided by implementations of the present disclosure are introduced above in detail. Specific individual examples are applied herein to set forth the principle and implementations of the present disclosure. The explanation of the above implementations is only used to help understand methods and core thoughts of the present disclosure. Meanwhile, for those skilled in the art, there will be changes in both the particular implementations and application scopes according to the thoughts of the present disclosure. In conclusion, the contents of this specification should not be interpreted as limitations to the present disclosure.

What is claimed is:

1. A semiconductor device, comprising:
    an active layer including a plurality of active units arranged in an array and disposed at intervals, the active layer having a first side and a second side at two ends of each of the active units, respectively;
    a bit line layer including a first bit line sub-layer disposed on the first side of the active layer and a second bit line sub-layer disposed on the second side of the active layer, the first bit line sub-layer and the second bit line sub-layer being connected with the two ends of each of the active units, respectively; and a plurality of capacitor structures disposed on the first side and the second side of the active layer and connected with the active units.

2. The semiconductor device of claim 1, wherein the first bit line sub-layer includes first bit lines, the second bit line sub-layer includes second bit lines, an extending direction of the first bit lines is parallel to an extending direction of the second bit lines, and orthographic projections of the first bit lines on the active layer are disposed not to overlap with orthographic projections of the second bit lines on the active layer.

3. The semiconductor device of claim 2, wherein the orthographic projections of the first bit lines on the active layer and the orthographic projections of the second bit lines on the active layer are disposed alternately.

4. The semiconductor device of claim 2, wherein the active units include first active pillars connected with the first bit lines and second active pillars connected with the second bit lines, the capacitor structures include first capacitor units and second capacitor units, the first capacitor units are disposed on the second side of the active layer, the second capacitor units are disposed on the first side of the active layer, the first capacitor units are connected with the first active pillars, and the second capacitor units are connected with the second active pillars.

5. The semiconductor device of claim 4, wherein
the first capacitor units include first subunits and second subunits,
the first subunits include first contact plugs, first lead portions and first capacitor portions, the first contact plugs being in contact connection with the first active pillars, the first capacitor portions being connected with the first contact plugs through the first lead portions, and
the second subunits include second contact plugs and second capacitor portions, the second contact plugs being in contact connection with the first active pillars, the second capacitor portions being connected with the first active pillars through the second contact plugs.

6. The semiconductor device of claim 5, wherein
the second capacitor units include third subunits and fourth subunits,
the third subunits include third contact plugs, second lead portions and third capacitor portions, the third contact plugs being in contact connection with the second active pillars, the third capacitor portions being connected with the third contact plugs through the second lead portions, and
the fourth subunits include fourth contact plugs and fourth capacitor portions, the fourth contact plugs being in contact connection with the second active pillars, the fourth capacitor portions being connected with the second active pillars through the fourth contact plugs.

7. The semiconductor device of claim 6, in orthographic projections of the first bit line sub-layer and the second bit line sub-layer on the active layer, leading-out directions of the respective first lead portions corresponding to the respective first bit lines are a same, leading-out directions of the respective second lead portions corresponding to the respective second bit lines are a same, and the leading-out directions of the first lead portions corresponding to the first bit lines are opposite to the leading-out directions of the second lead portions corresponding to the adjacent second bit lines.

8. The semiconductor device of claim 4, wherein orthographic projections of the first capacitor units on the active layer overlap with the orthographic projections of the first bit lines and the second bit lines on the active layer, and orthographic projections of the second capacitor units on the active layer overlap with the orthographic projections of both the first bit lines and the second bit lines on the active layer.

9. The semiconductor device of claim 8, wherein the first capacitor units include fifth capacitor portions and fifth contact plugs, the fifth contact plugs being in contact connection with the first active pillars, the fifth capacitor portions expanding in a direction toward the adjacent first bit lines, an expanding direction of the fifth capacitor portions being perpendicular to the extending direction of the first bit lines, and the second capacitor units include sixth capacitor portions and sixth contact plugs, the sixth contact plugs being in contact connection with the second active pillars, the sixth capacitor portions expanding in a direction toward the adjacent second bit lines, an expanding direction of the sixth capacitor portions being perpendicular to the extending direction of the second bit lines.

10. The semiconductor device of claim 9, wherein
the fifth capacitor portions include first ends connected with the fifth contact plugs and second ends far away from the fifth contact plugs, and the sixth capacitor portions include third ends connected with the sixth contact plugs and fourth ends far away from the sixth contact plugs,
in orthographic projections of the capacitor structures on the active layer, a direction from the first ends to the second ends is a first expanding direction and a direction from the third ends to the fourth ends is a second expanding direction, and
the first expanding directions of two adjacent ones of the first capacitor units corresponding to a same first bit line are a same, and the second expanding directions of two adjacent ones of the second capacitor units corresponding to a same second bit line are a same; or
the first expanding directions of two adjacent ones of the first capacitor units corresponding to a same first bit line are opposite, and the second expanding directions of two adjacent ones of the second capacitor units corresponding to a same second bit line are opposite.

11. The semiconductor device of claim 4, wherein in orthographic projections of the capacitor structures and the bit line layer on the active layer, sizes of the first capacitor units in a direction perpendicular to the first bit lines are larger than sizes of the first capacitor units in a direction parallel to the first bit lines and sizes of the second capacitor units in a direction perpendicular to the second bit lines are larger than sizes of the second capacitor units in a direction parallel to the second bit lines.

12. The semiconductor device of claim 1, wherein the first bit line sub-layer include first bit line groups of which an extending direction is a first direction, and two columns of the active units arranged alternately along the first direction correspond to one of the first bit line groups, the second bit line sub-layer include second bit line groups of which an extending direction is the first direction, and two columns of the active units arranged alternately along the first direction correspond to one of the second bit line groups.

13. The semiconductor device of claim 12, wherein orthographic projections of the first bit line groups on the active layer are disposed to overlap with orthographic projections of the second bit line groups on the active layer.

14. The semiconductor device of claim 12, wherein the first bit line groups include first insulating portions and first conductor portions disposed between the first insulating portions and the active layer, the second bit line groups include second insulating portions and second conductor portions disposed between the second insulating portions and the active layer, and the active units connected to the first conductor portions are different from the active units connected to the second conductor portions.

15. The semiconductor device of claim 12, wherein the capacitor structures include capacitor components and contact plug portions, the contact plug portions are disposed within the bit line layer and include contact conductive sub-portions and contact insulating sub-portions between the contact conductive sub-portions and the bit line layer, and the capacitor components are in contact connection with the active units through the contact conductive sub-portions.

16. The semiconductor device of claim 15, wherein
the active units include first active pillars connected with the first bit line groups and second active pillars connected with the second bit line groups,
the capacitor components include seventh capacitor portions and eighth capacitor portions,
the seventh capacitor portions are disposed on the second side of the active layer,
the eighth capacitor portions are disposed on the first side of the active layer,
the seventh capacitor portions are connected with the first active pillars, and
the eighth capacitor portions are connected with the second active pillars.

17. The semiconductor device of claim 16, wherein a direction perpendicular to an extending direction of the first bit line groups is a second direction, and the first active pillars and the second active pillars are disposed alternately along the first direction and the second direction.

18. The semiconductor device of claim 1, further comprising word lines disposed on sidewalls of the active units.

19. A memory, comprising a semiconductor device, the semiconductor device including:
an active layer including a plurality of active units arranged in an array and disposed at intervals, the active layer having a first side and a second side at two ends of each of the active units, respectively;
a bit line layer including a first bit line sub-layer disposed on the first side of the active layer and a second bit line sub-layer disposed on the second side of the active layer, the first bit line sub-layer and the second bit line sub-layer being connected with the two ends of each of the active units, respectively; and
a plurality of capacitor structures disposed on the first side and the second side of the active layer and connected with the active units.

20. A storage system, comprising:
a memory, the memory including a semiconductor device, the semiconductor device including:
an active layer including a plurality of active units arranged in an array and disposed at intervals, the active layer having a first side and a second side at two ends of each of the active units, respectively;
a bit line layer including a first bit line sub-layer disposed on the first side of the active layer and a second bit line sub-layer disposed on the second side of the active layer, the first bit line sub-layer and the second bit line sub-layer being connected with the two ends of each of the active units, respectively; and
a plurality of capacitor structures disposed on the first side and the second side of the active layer and connected with the active units of claim 19 and a controller that is coupled to the memory and used for controlling the memory to store data; and
a controller that is coupled to the memory and used for controlling the memory to store data.

* * * * *